(12) United States Patent
Levi et al.

(10) Patent No.: US 10,441,904 B2
(45) Date of Patent: *Oct. 15, 2019

(54) FREEZING RESISTANT LIQUID FILTER

(71) Applicant: A.L. FILTER CO., LTD., Ashdod (IL)

(72) Inventors: Itsik Levi, Bat Yam (IL); Niv Markel, Holon (IL); Yaakov Ben Shimon, Rehovot (IL)

(73) Assignee: A.L. FILTER CO., LTD., Ashdod (IL)

( * ) Notice: Subject to any disclaimer, the term of this patent is extended or adjusted under 35 U.S.C. 154(b) by 72 days.

This patent is subject to a terminal disclaimer.

(21) Appl. No.: 15/849,008

(22) Filed: Dec. 20, 2017

(65) Prior Publication Data

US 2018/0133626 A1 May 17, 2018

Related U.S. Application Data

(63) Continuation of application No. 14/954,330, filed on Nov. 30, 2015, now Pat. No. 9,895,633.

(60) Provisional application No. 62/100,129, filed on Jan. 6, 2015.

(51) Int. Cl.
*B01D 29/21* (2006.01)
*B01D 35/31* (2006.01)

(52) U.S. Cl.
CPC ........... *B01D 29/21* (2013.01); *B01D 35/31* (2013.01); *B01D 2201/0415* (2013.01); *B01D 2201/12* (2013.01); *B01D 2201/403* (2013.01)

(58) Field of Classification Search
None
See application file for complete search history.

(56) References Cited

U.S. PATENT DOCUMENTS

| | | | |
|---|---|---|---|
| 4,575,422 | A | 3/1986 | Zimmer |
| 4,842,737 | A | 6/1989 | Reed |
| 5,399,264 | A | 3/1995 | Pulek et al. |
| 7,481,319 | B2 | 1/2009 | Jokschas et al. |
| 8,377,295 | B2 | 2/2013 | Strassenberger |
| 9,409,104 | B2 | 8/2016 | Pflueger et al. |
| 9,895,633 | B2 | 2/2018 | Levi et al. |
| 2010/0314308 | A1 | 12/2010 | Pflueger et al. |
| 2012/0132582 | A1 | 5/2012 | Gluck et al. |
| 2012/0312733 | A1 | 12/2012 | Elayed et al. |
| 2013/0312733 | A1 | 11/2013 | Sorken |
| 2014/0158607 | A1 | 6/2014 | Xia et al. |
| 2015/0008172 | A1 | 1/2015 | Kocksch |

(Continued)

FOREIGN PATENT DOCUMENTS

| | | |
|---|---|---|
| DE | 102006003551 | 9/2008 |
| DE | 202007010956 | 12/2008 |

(Continued)

OTHER PUBLICATIONS

European Search Report dated May 30, 2016 which issued during the prosecution of Applicant's European App No. 15196972.2.

(Continued)

*Primary Examiner* — Benjamin M Kurtz
(74) *Attorney, Agent, or Firm* — Sughrue Mion, PLLC

(57) ABSTRACT

A freezing resistant liquid filter including a housing having a liquid inlet and a liquid outlet and a freezing compensating filter element disposed within the housing and including a folded filter medium having a plurality of interstices and freezing compressible elements located at the interstices.

10 Claims, 30 Drawing Sheets

(56) References Cited

U.S. PATENT DOCUMENTS

2015/0258473 A1* 9/2015 Sakraschinsky ....... B01D 29/15
                                                    210/137
2016/0193552 A1   7/2016 Levi et al.

FOREIGN PATENT DOCUMENTS

| DE | 202009003704 | 8/2010 |
| DE | 102012005733 | 4/2013 |
| DE | 102009061063 | 9/2013 |
| EP | 2609978 | 7/2013 |
| EP | 2742984 | 6/2014 |
| EP | 3042707 | 7/2016 |
| WO | 2013/092010 | 6/2013 |
| WO | 2013/139523 | 9/2013 |
| WO | 2014/032902 | 3/2014 |

OTHER PUBLICATIONS

An Office Action dated Jul. 28, 2017, which issued during the prosecution of U.S. Appl. No. 14/954,330.
Notice of Allowance dated Dec. 7, 2017, which issued during the prosecution of U.S. Appl. No. 14/954,330.
U.S. Appl. No. 62/100,129, filed Jan. 6, 2015.

* cited by examiner

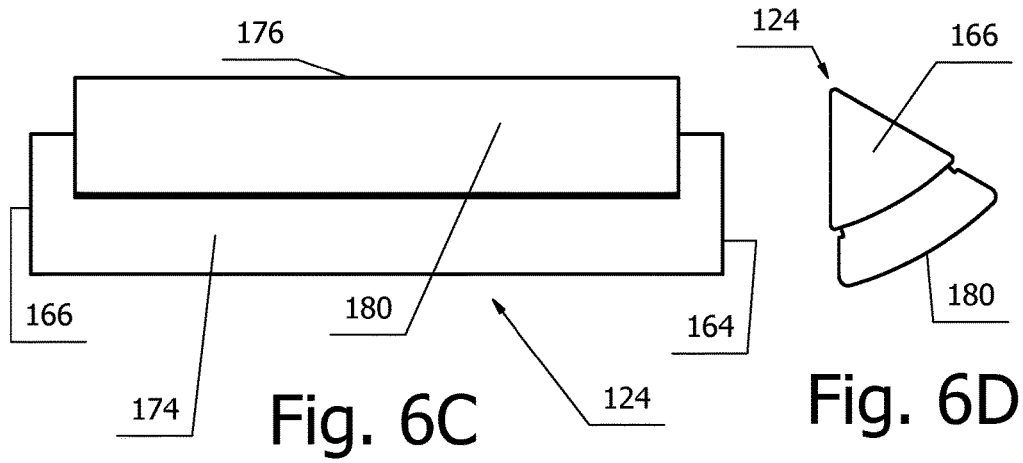
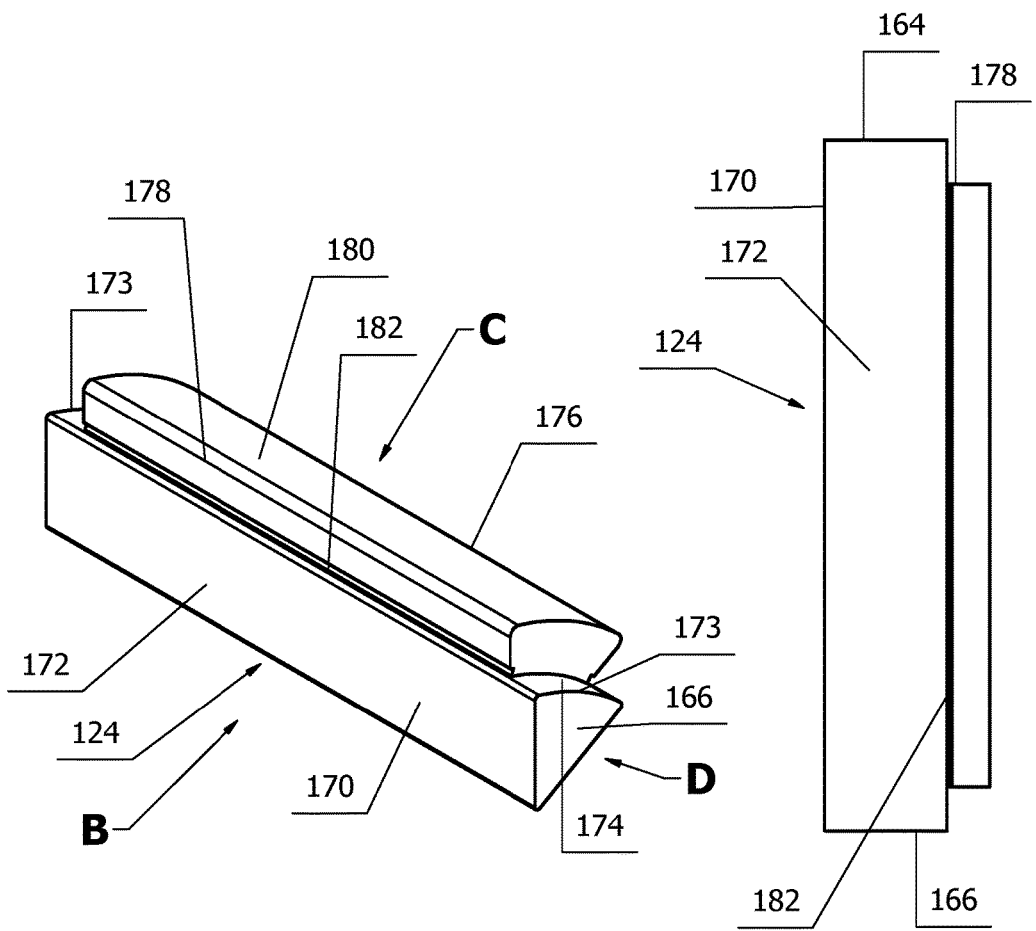

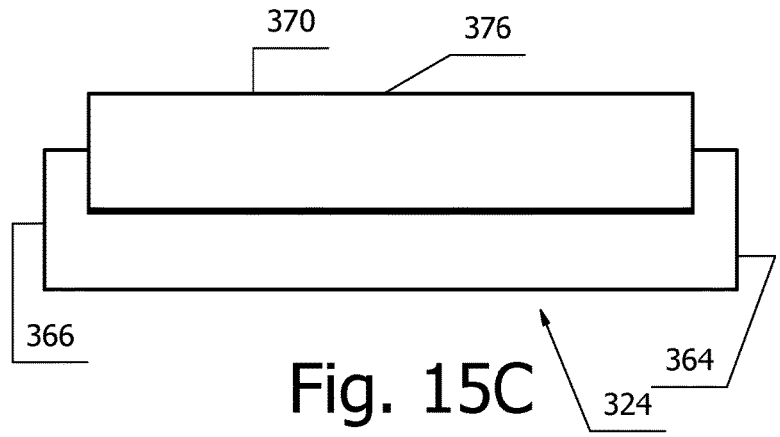
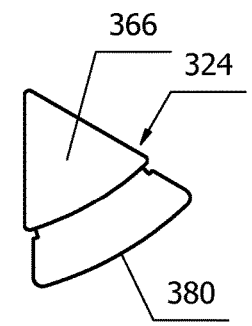
Fig. 15C
Fig. 15D
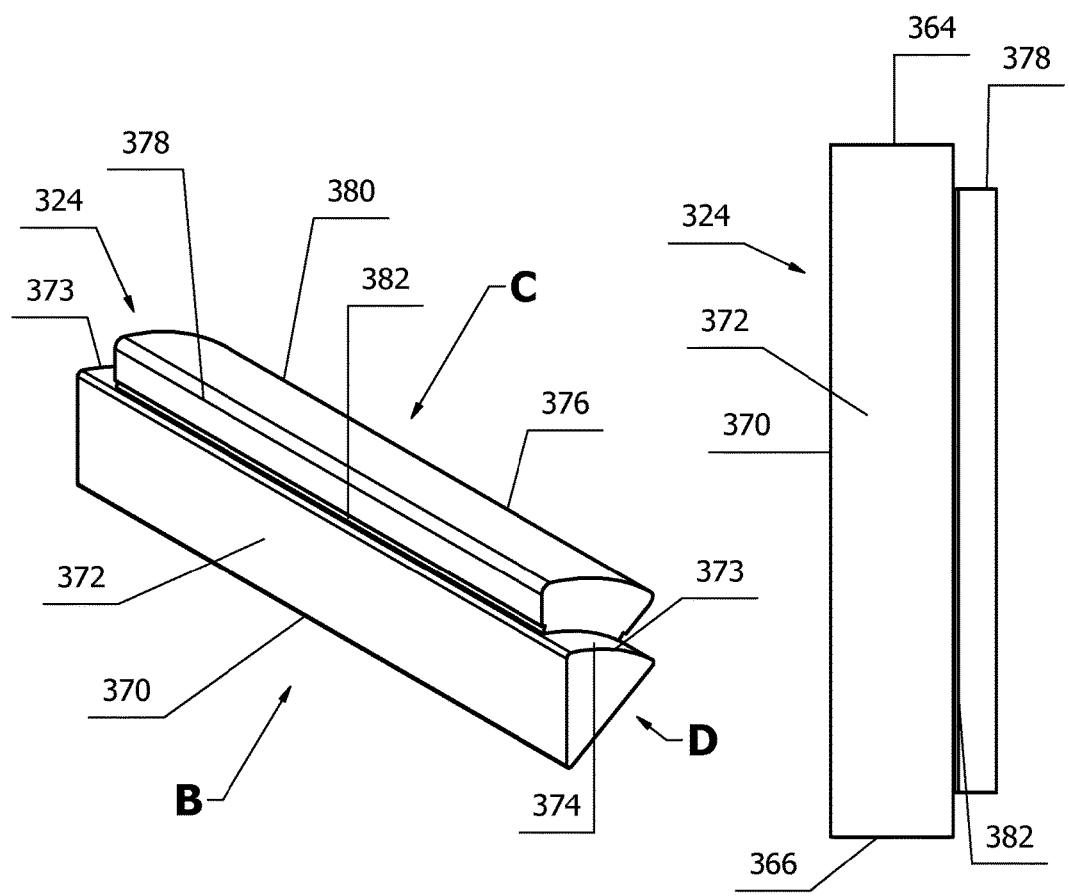
Fig. 15A
Fig. 15B

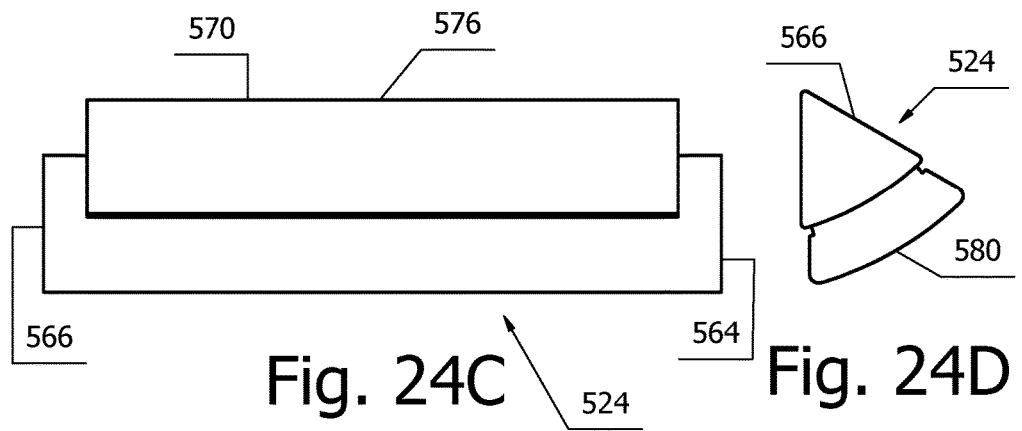
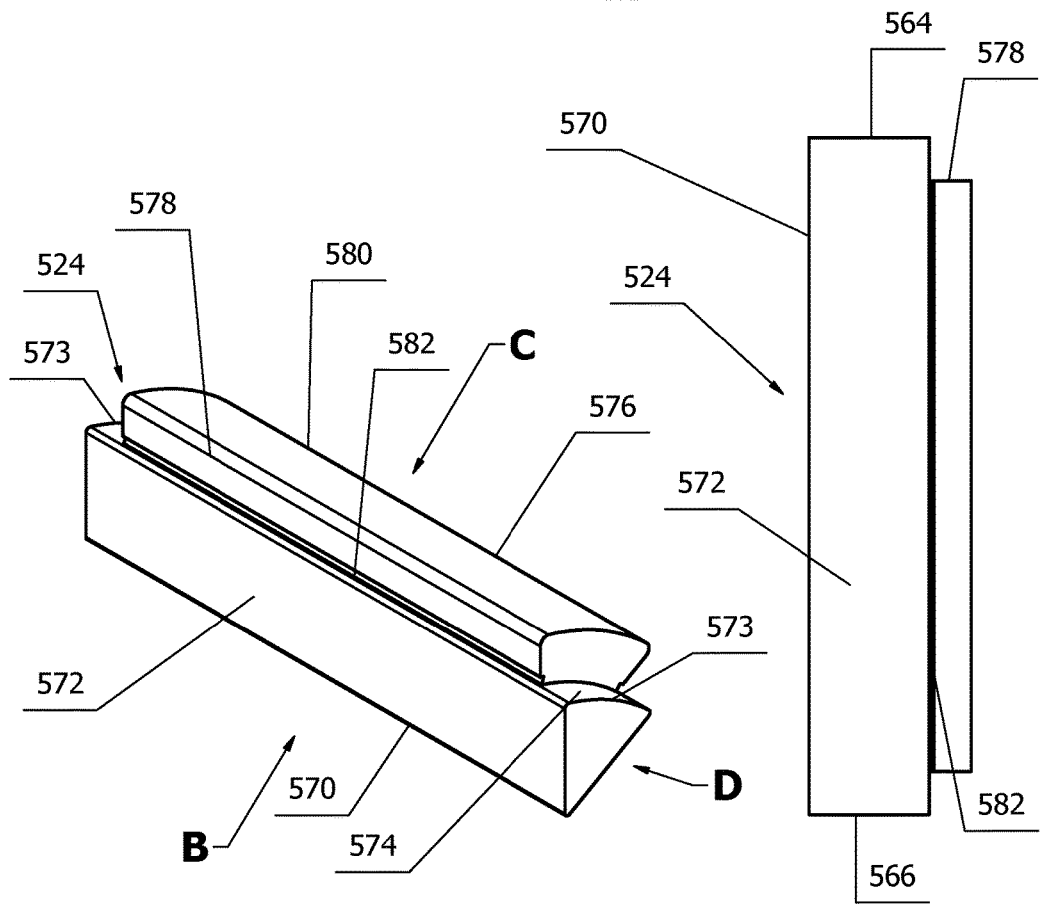

FREEZING RESISTANT LIQUID FILTER

CROSS-REFERENCE TO RELATED APPLICATIONS

The present application is a continuation application of U.S. patent application Ser. No. 14/954,330, filed Nov. 30, 2015, entitled FREEZING RESISTANT LIQUID FILTER, which claims priority of U.S. Provisional Patent Application Ser. No. 62/100,129, filed Jan. 6, 2015 and entitled "FREEZING RESISTANT LIQUID FILTER", the disclosures of which are hereby incorporated by reference.

FIELD OF THE INVENTION

The present invention relates to liquid filters generally and more particularly to filters for water-based solutions.

BACKGROUND OF THE INVENTION

Various types of liquid filters are known.

SUMMARY OF THE INVENTION

The present invention seeks to provide a freezing compensating filter element assembly.

There is thus provided in accordance with a preferred embodiment of the present invention a freezing resistant liquid filter including a housing having a liquid inlet and a liquid outlet and a freezing compensating filter element disposed within the housing and including a folded filter medium having a plurality of interstices and freezing compressible elements located at the interstices.

There is also provided in accordance with another preferred embodiment of the present invention a freezing compensating filter element for use in a freezing resistant liquid filter, the freezing compensating filter element including a folded filter medium having a plurality of interstices and freezing compressible elements located at the interstices.

Preferably, the freezing compensating filter element also includes channel elements retaining the freezing compressible elements in the interstices. Additionally or alternatively, the freezing compressible elements are formed to have a cross-section which generally corresponds to the cross-section of the interstices in which they are located.

In accordance with a preferred embodiment of the present invention the freezing compressible elements are configured and mounted within the freezing compensating filter element such that the functionality and integrity of the freezing compensating filter element are not compromised by compression thereof since generally such compression does not displace or distort the folded filter medium and the presence of the freezing compressible elements does not adversely affect liquid flow through the filter.

Preferably, the channel elements define configurations of the freezing compressible elements in both frozen and non-frozen operative orientations.

In accordance with a preferred embodiment of the present invention the channel elements form part of an integrally formed channel defining element having top and bottom rings.

BRIEF DESCRIPTION OF THE DRAWINGS

The present invention will be understood and appreciated more fully from the following detailed description, taken in conjunction with the drawings in which:

FIGS. 6A, 6B, 6C & 6D are simplified illustrations of a compressible element forming part of the freezing compensating filter element assembly in an unfrozen and uncompressed state, FIG. 6A being a pictorial illustration and FIGS. 6B, 6C & 6D being plan views taken in various directions indicated by arrows B, C and D in FIG. 6A;

FIGS. 15A, 15B, 15C & 15D are simplified illustrations of a compressible element forming part of the freezing compensating filter element assembly in an unfrozen and uncompressed state, FIG. 15A being a pictorial illustration and FIGS. 15B, 15C & 15D being plan views taken in various directions indicated by arrows B, C and D in FIG. 15A;

Figure 13:
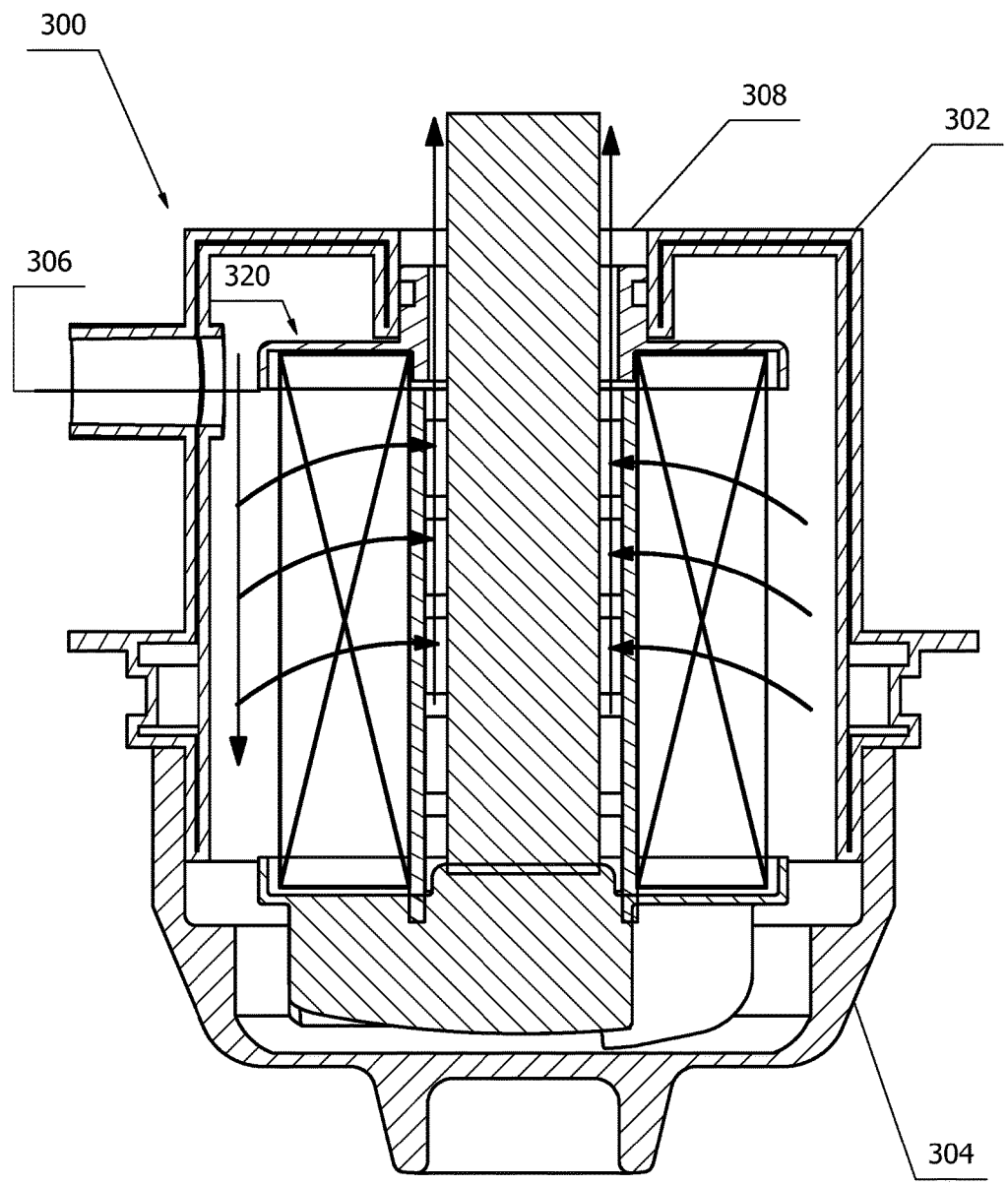
FIG. 13 is a simplified sectional illustration showing liquid flow through the liquid filter assembly of FIGS. 10A-12.
Figure 14:
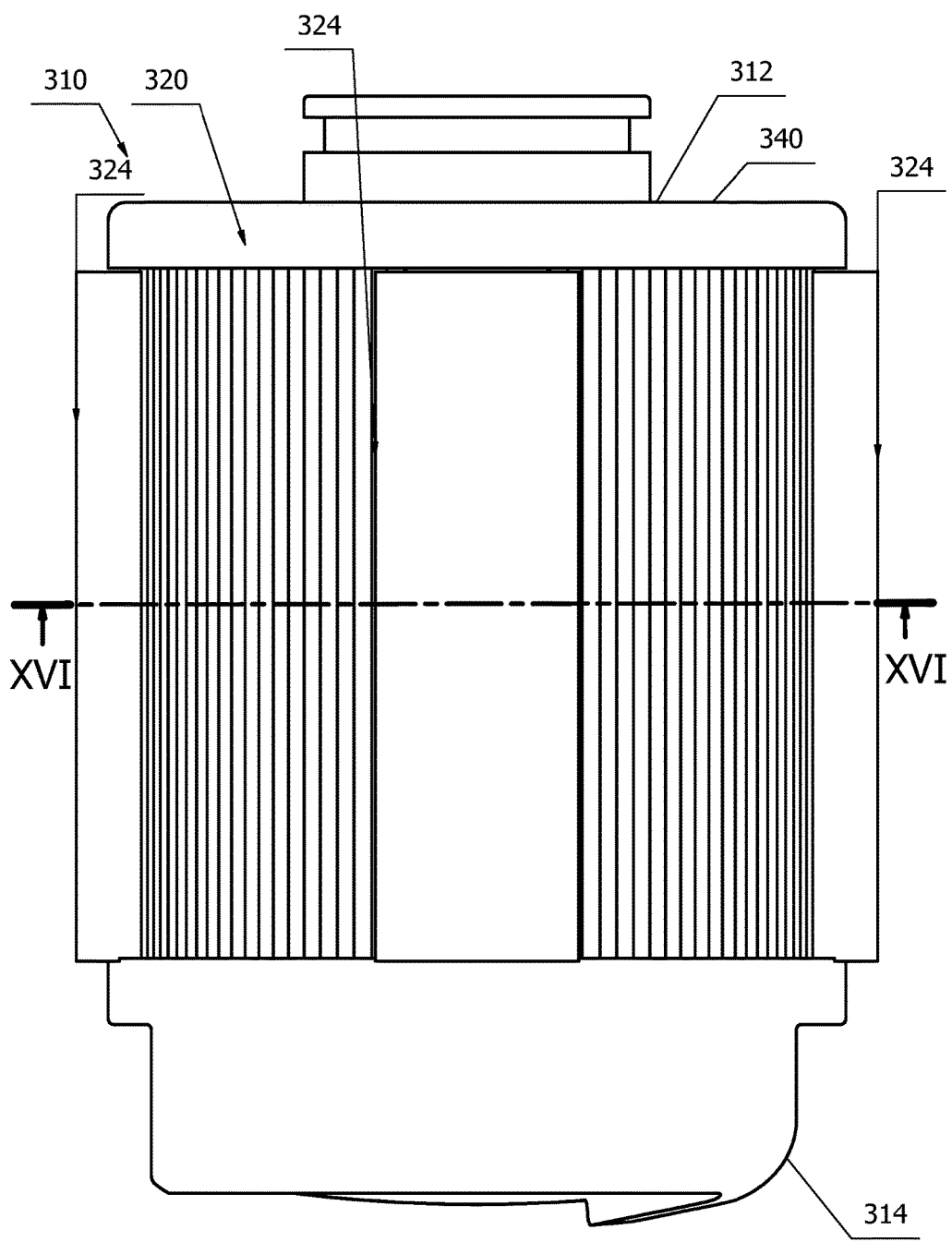
FIG. 14 is a simplified side view illustration of the freezing compensating filter element assembly of FIGS. 10A-13.
Figure 16:
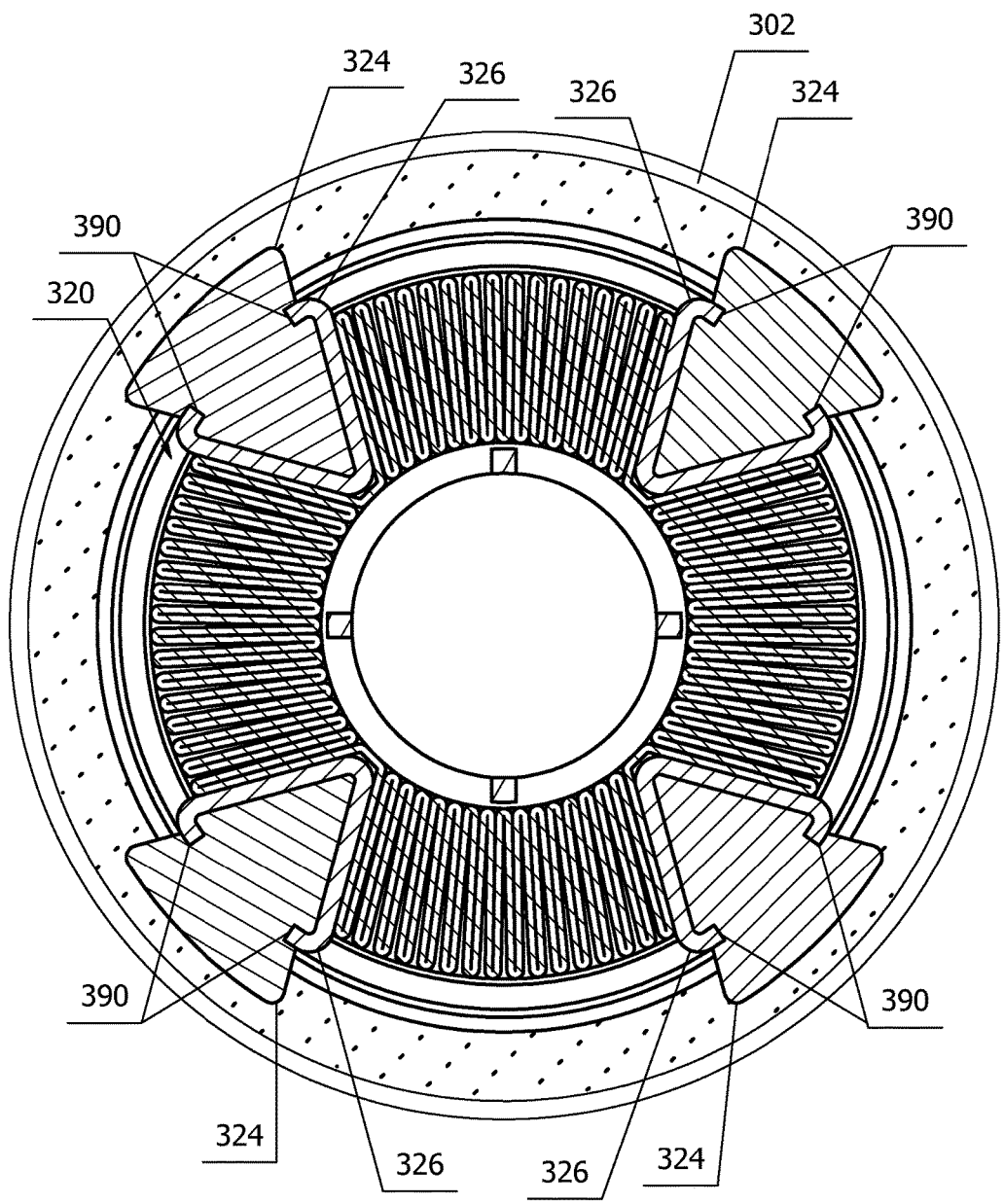
FIG. 16 is a simplified cross-sectional illustration of a portion of the liquid filter assembly of FIG. 13 showing a section of the freezing compensating filter element of FIG.
Figure 17:
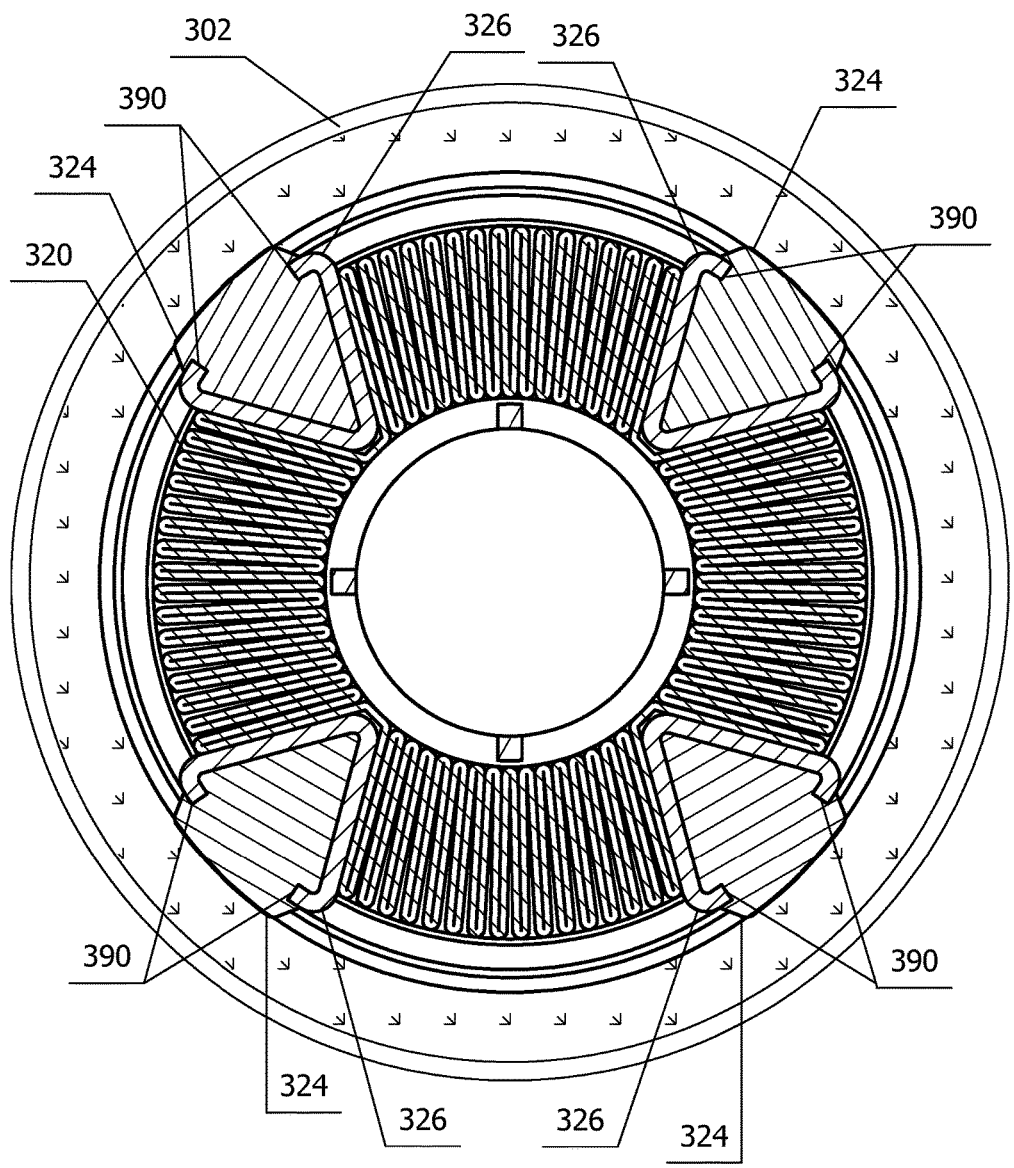
Figure 18:
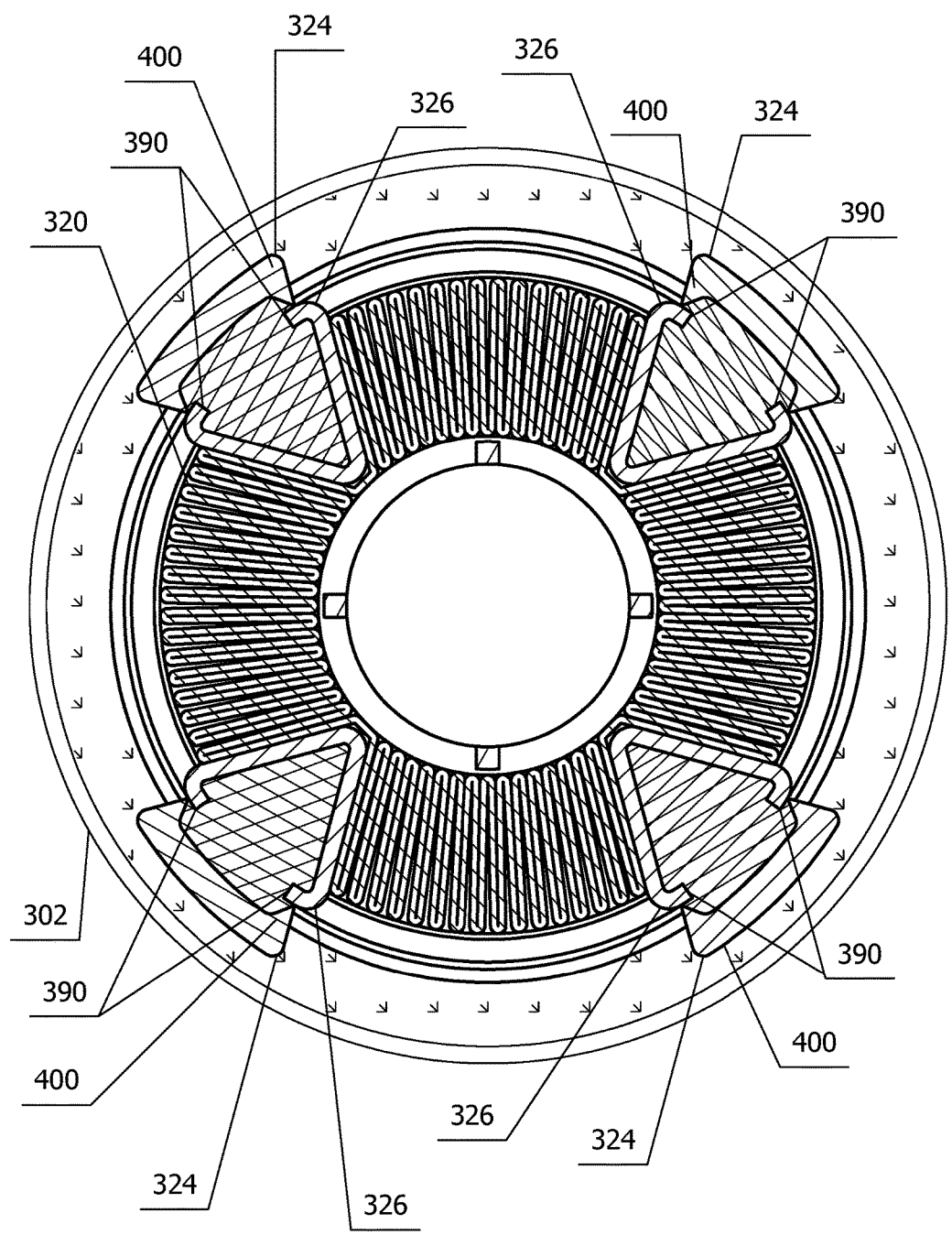
Figure 19A:
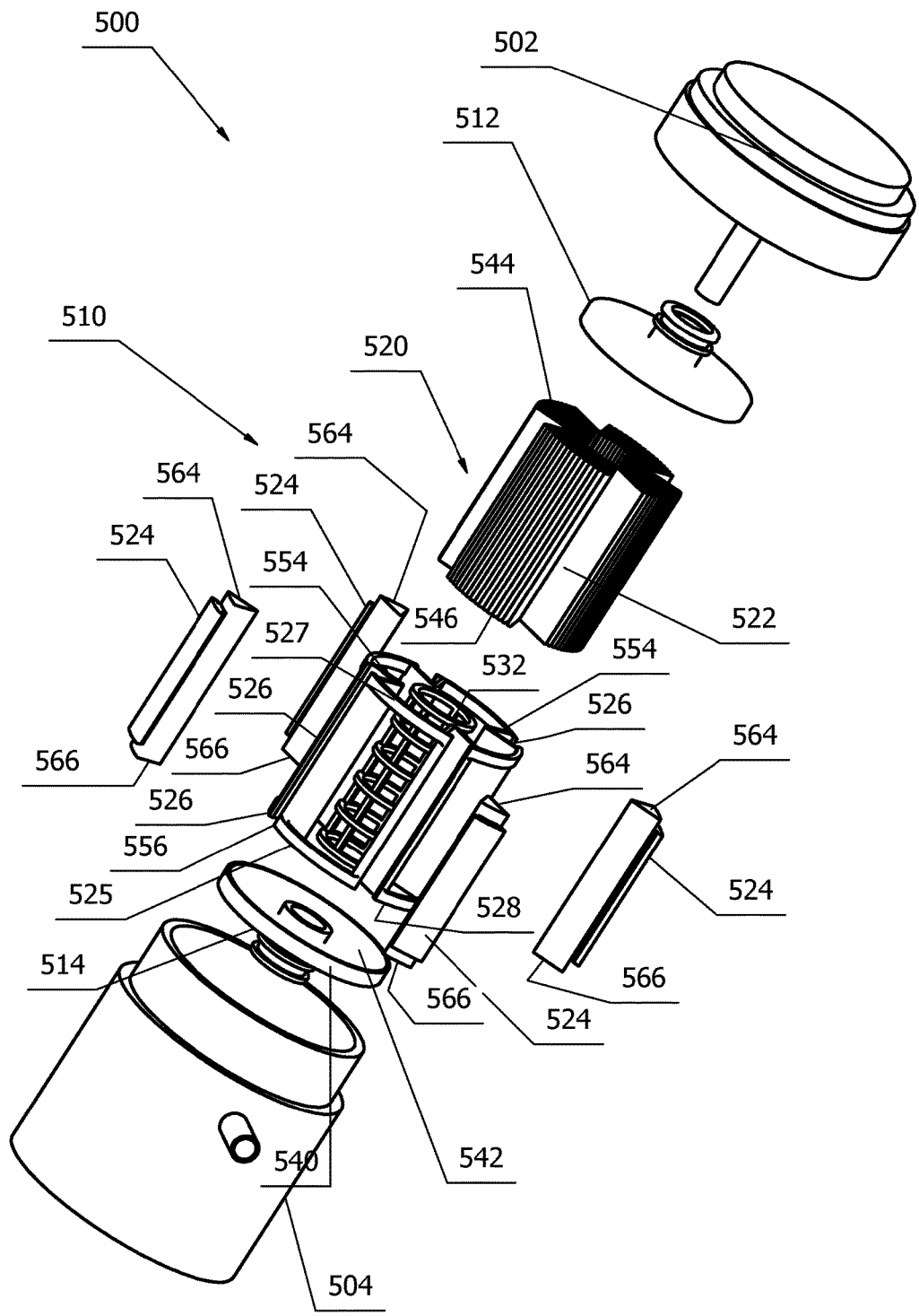
Figure 19B:
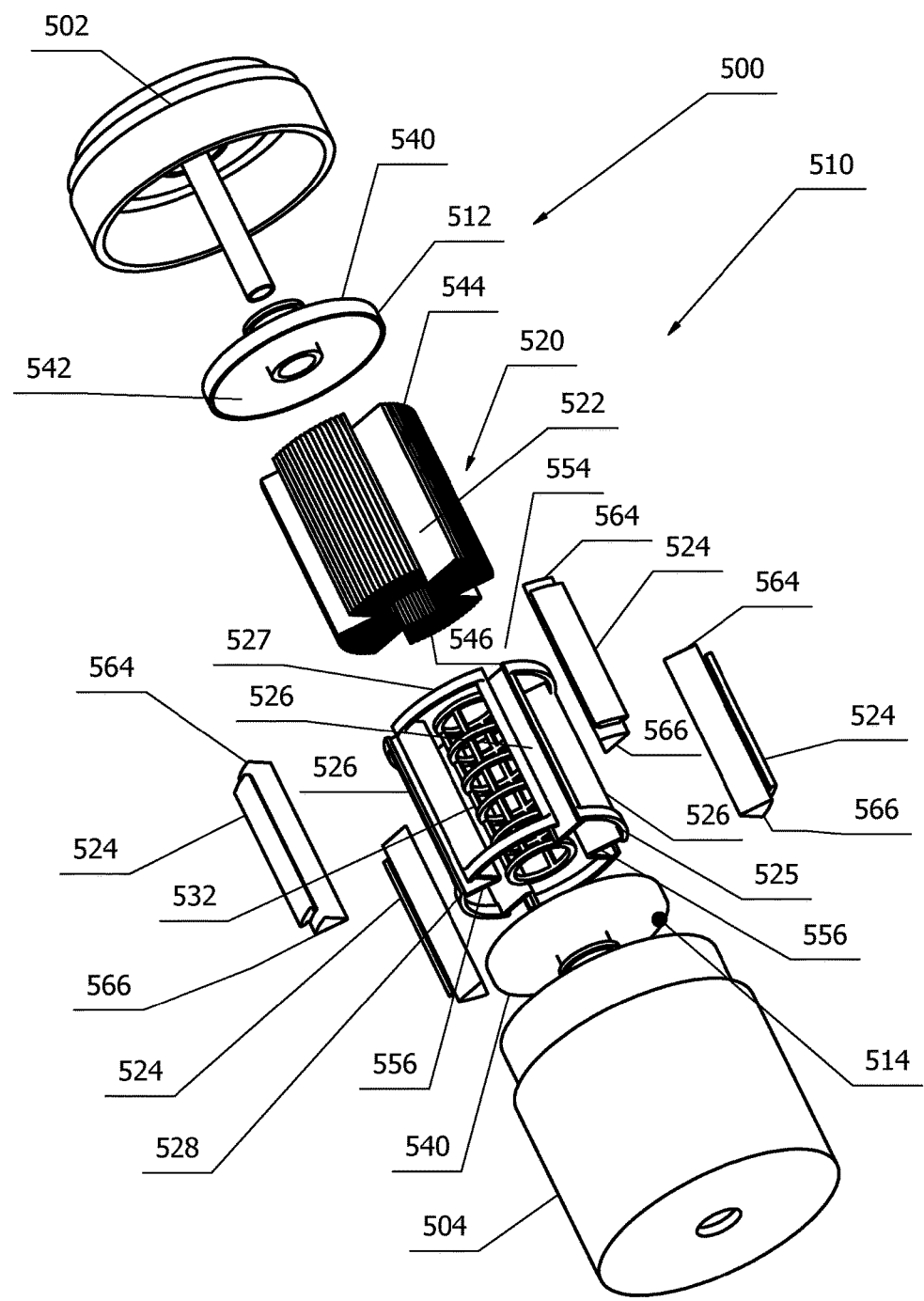
Figure 20:
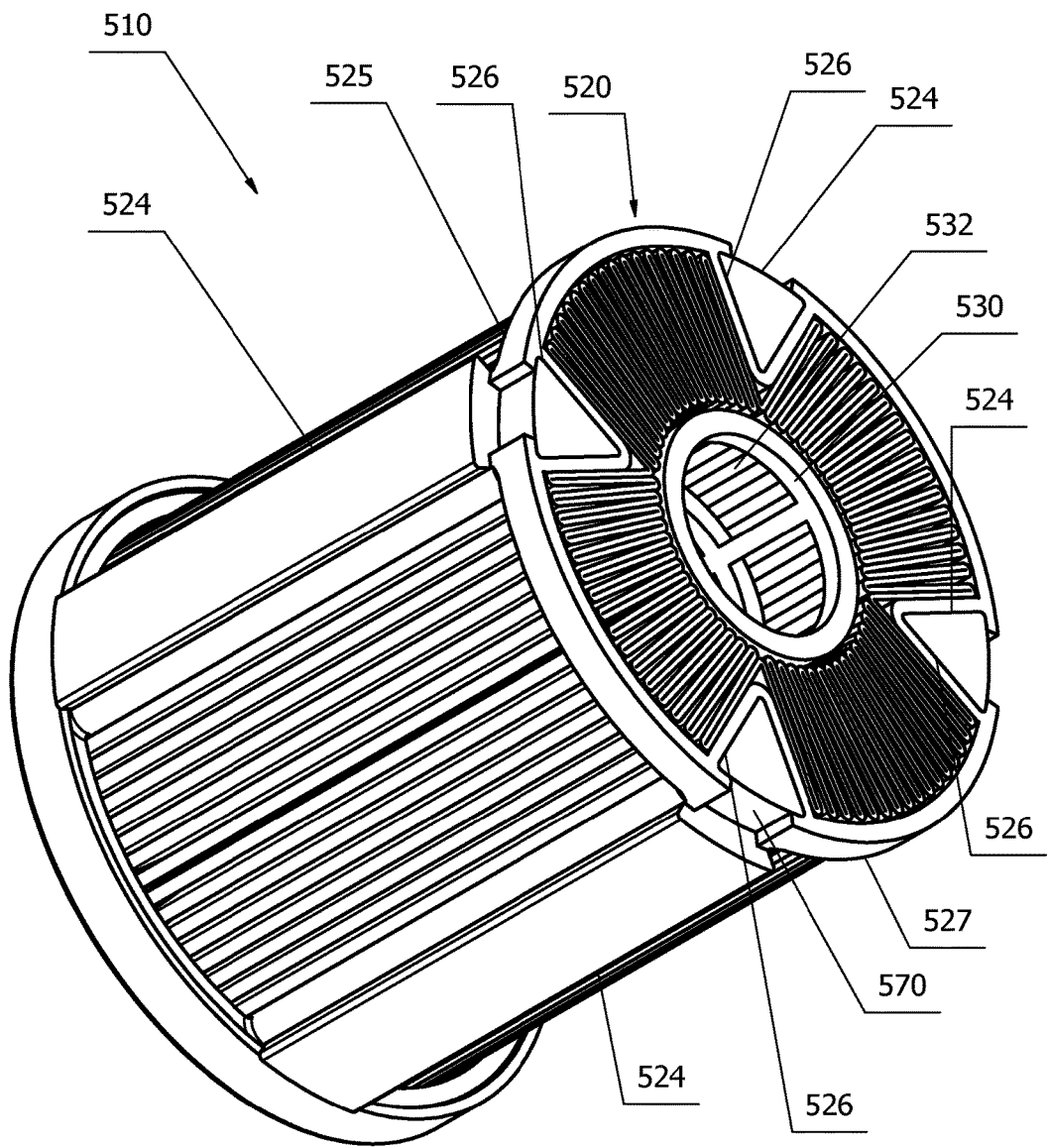
Figure 21:
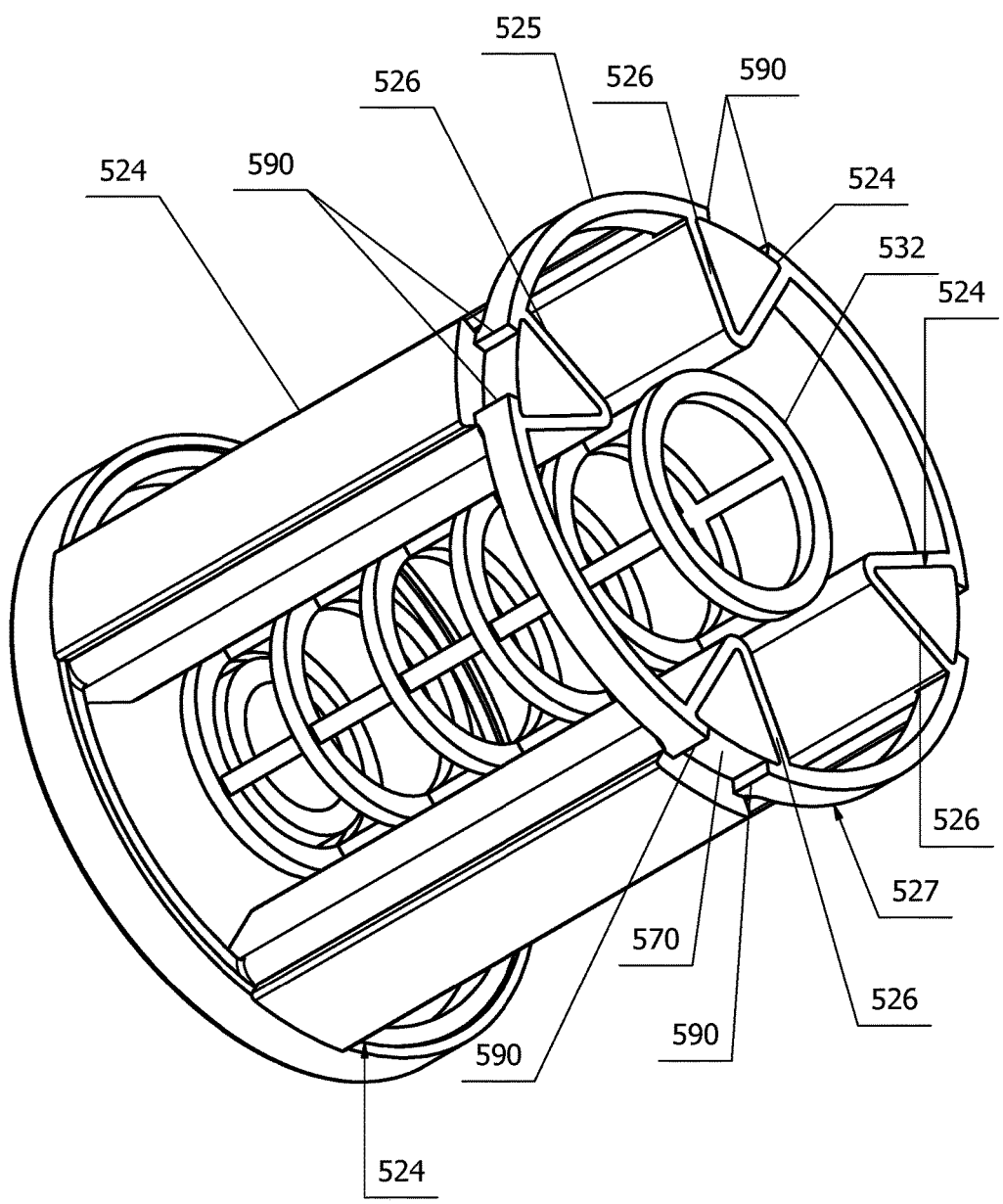
Figure 22:
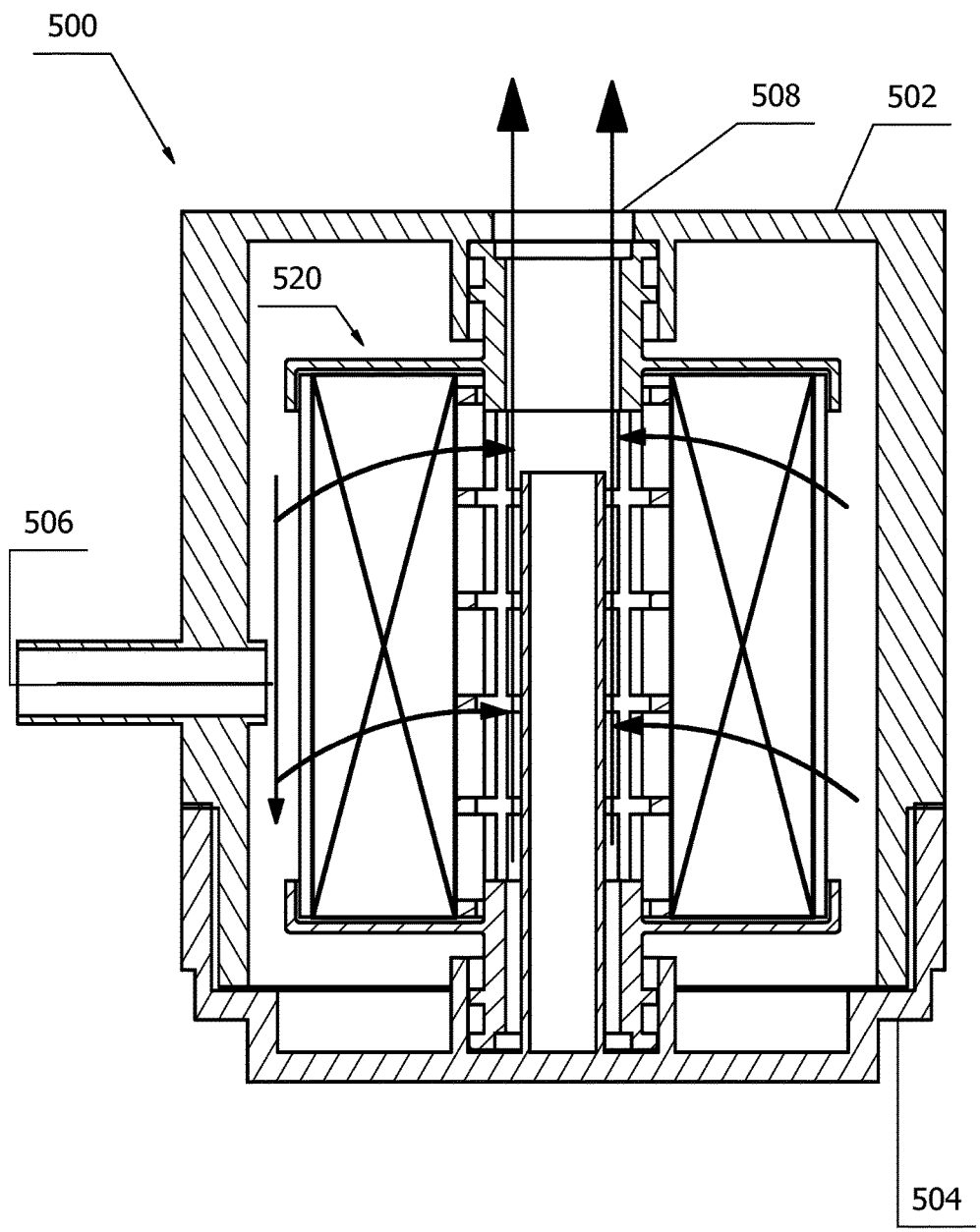
Figure 23:
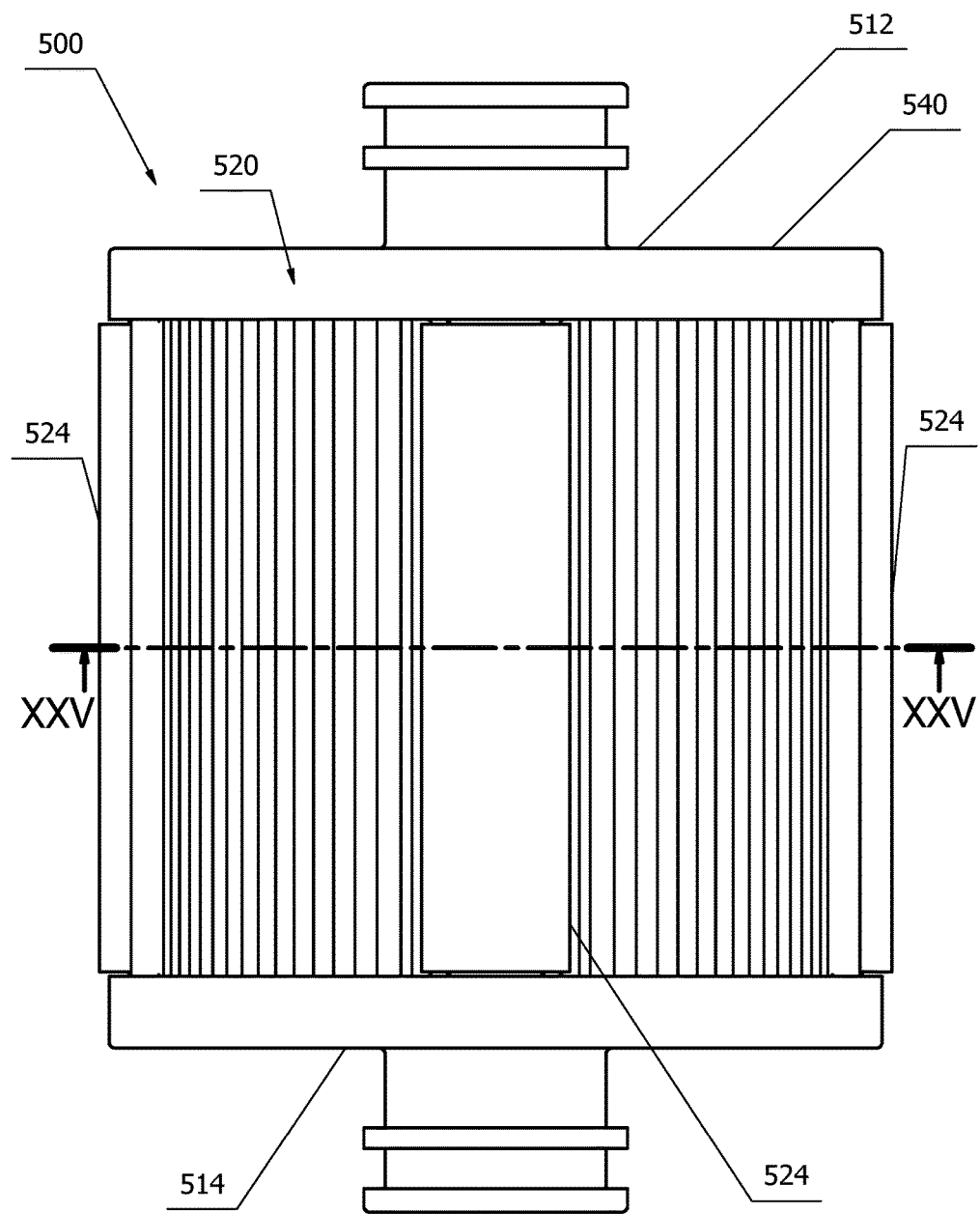
Figure 25:
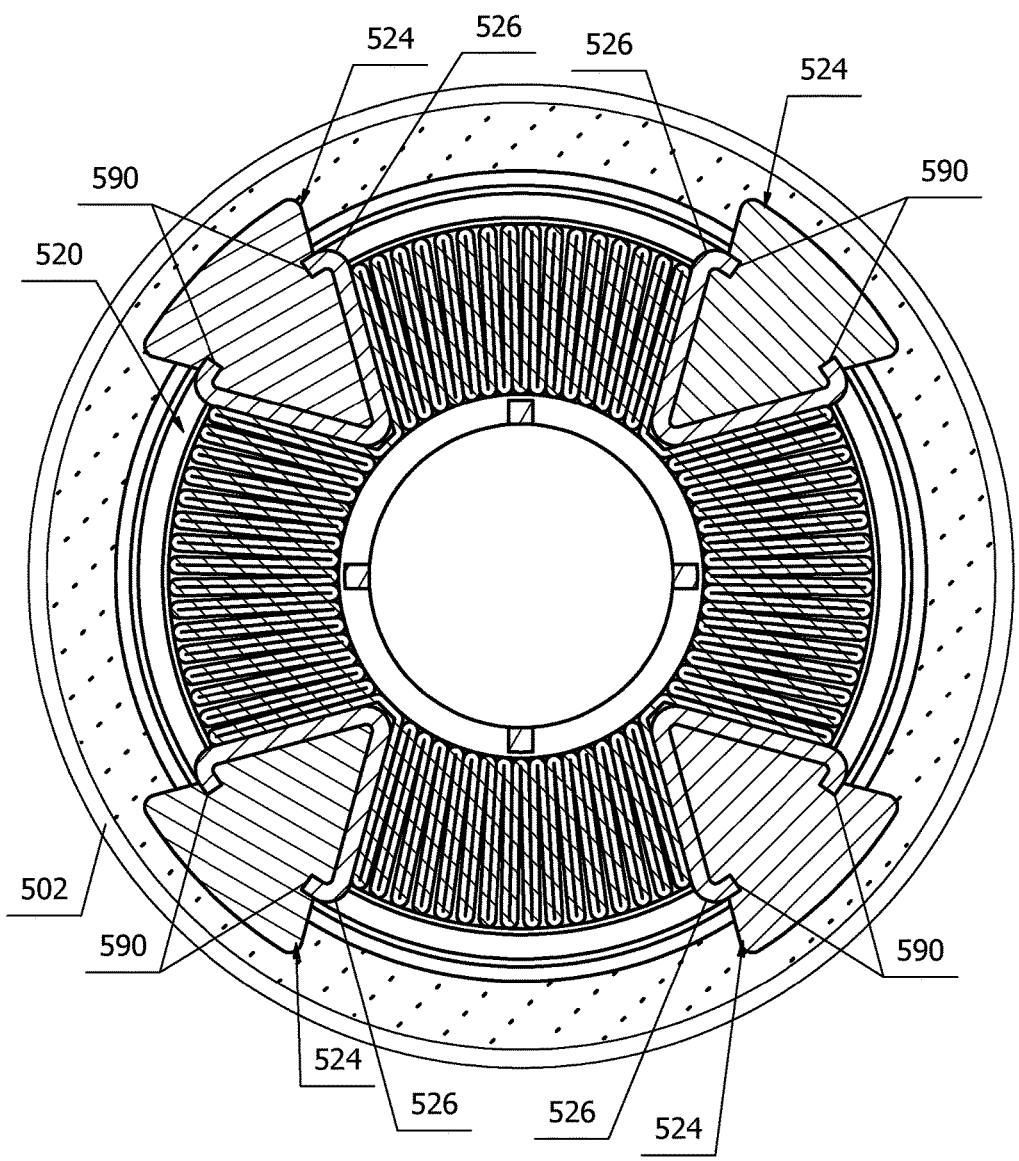
Figure 26:
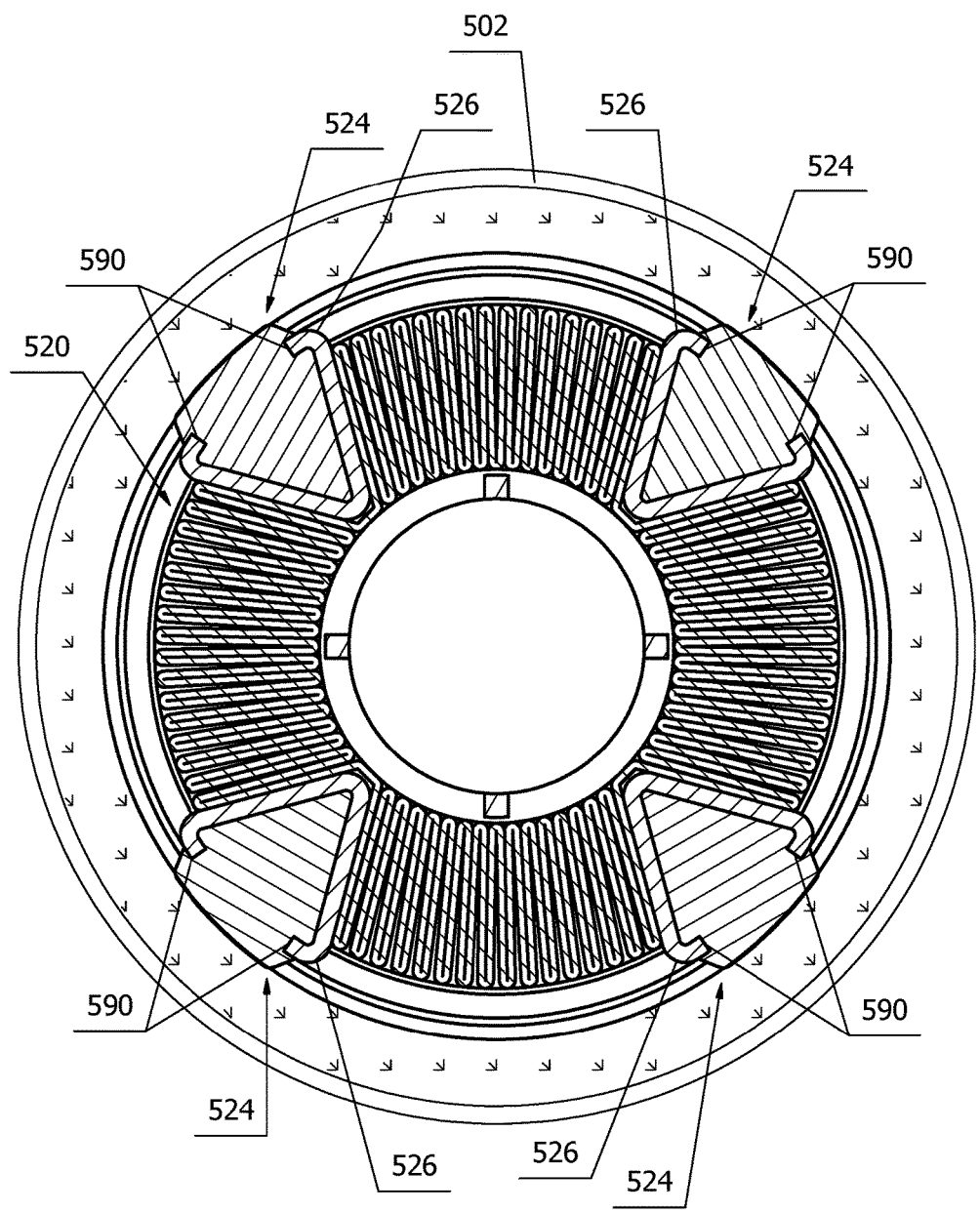
Figure 27:
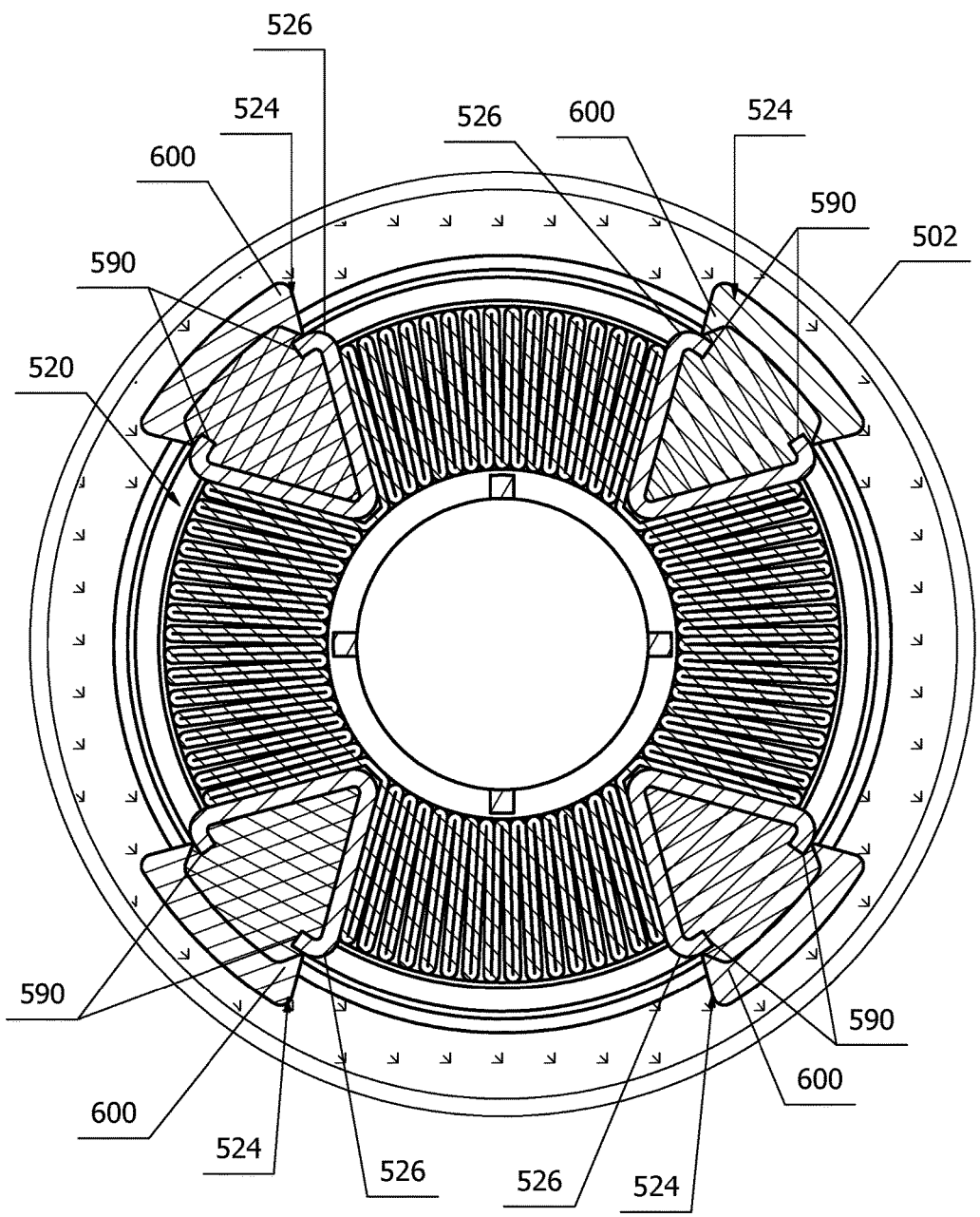

11, taken along lines XVI-XVI in FIG. 14, and shows the operative orientation of the compressible elements in an unfrozen state;

FIG. 17 is a simplified cross-sectional illustration of a portion of the liquid filter assembly of FIG. 13, which is similar to FIG. 16 but shows the operative orientation of the compressible elements in a frozen operational state;

FIG. 18 is a comparative illustration of a portion of the liquid filter assembly of FIG. 13, which is based on the simplified cross-sectional illustrations of FIGS. 16 and 17, and shows the operative orientations of the compressible elements in two operational states, unfrozen and frozen;

FIGS. 19A & 19B are simplified first and second exploded view illustrations of a liquid filter assembly, taken from different directions, constructed and operative in accordance with yet another preferred embodiment of the present invention;

FIG. 20 is a simplified pictorial illustration of a freezing compensating filter element assembly, constructed and operative in accordance with a preferred embodiment of the present invention, forming part of the liquid filter assembly of FIGS. 19A & 19B, wherein a top cap of the liquid filter assembly has been removed;

FIG. 21 is a simplified pictorial illustration of portions of the freezing compensating filter element assembly of FIG. 20;

FIG. 22 is a simplified sectional illustration showing liquid flow through the liquid filter assembly of FIGS. 19A-21;

FIG. 23 is a simplified side view illustration of the freezing compensating filter element assembly of FIGS. 19A-22;

FIGS. 24A, 24B, 24C & 24D are simplified illustrations of a compressible element forming part of the freezing compensating filter element assembly in an unfrozen and uncompressed state, FIG. 24A being a pictorial illustration and FIGS. 24B, 24C & 24D being plan views taken in various directions indicated by arrows B, C and D in FIG. 24A;

FIG. 25 is a simplified cross-sectional illustration of a portion of the liquid filter assembly of FIG. 22 showing a section of the freezing compensating filter element of FIG. 20, taken along lines XXV-XXV in FIG. 23, and shows the operative orientation of the compressible elements in an unfrozen state;

FIG. 26 is a simplified cross-sectional illustration of a portion of the liquid filter assembly of FIG. 22, which is similar to FIG. 25 but shows the operative orientation of the compressible elements in a frozen operational state; and FIG. 27 is a comparative illustration of a portion of the liquid filter assembly of FIG. 22, which is based on the simplified cross-sectional illustrations of FIGS. 25 and 26, and shows the operative orientations of the compressible elements in two operational states, unfrozen and frozen.

DETAILED DESCRIPTION OF PREFERRED EMBODIMENTS

Reference is now made to FIGS. 1A-9, which illustrate a liquid filter assembly 100, constructed and operative in accordance with a preferred embodiment of the present invention. The liquid filter assembly may be employed for any suitable liquid filtering applications both static and vehicular and may be beneficially employed as a urea filter.

Figure 1A:
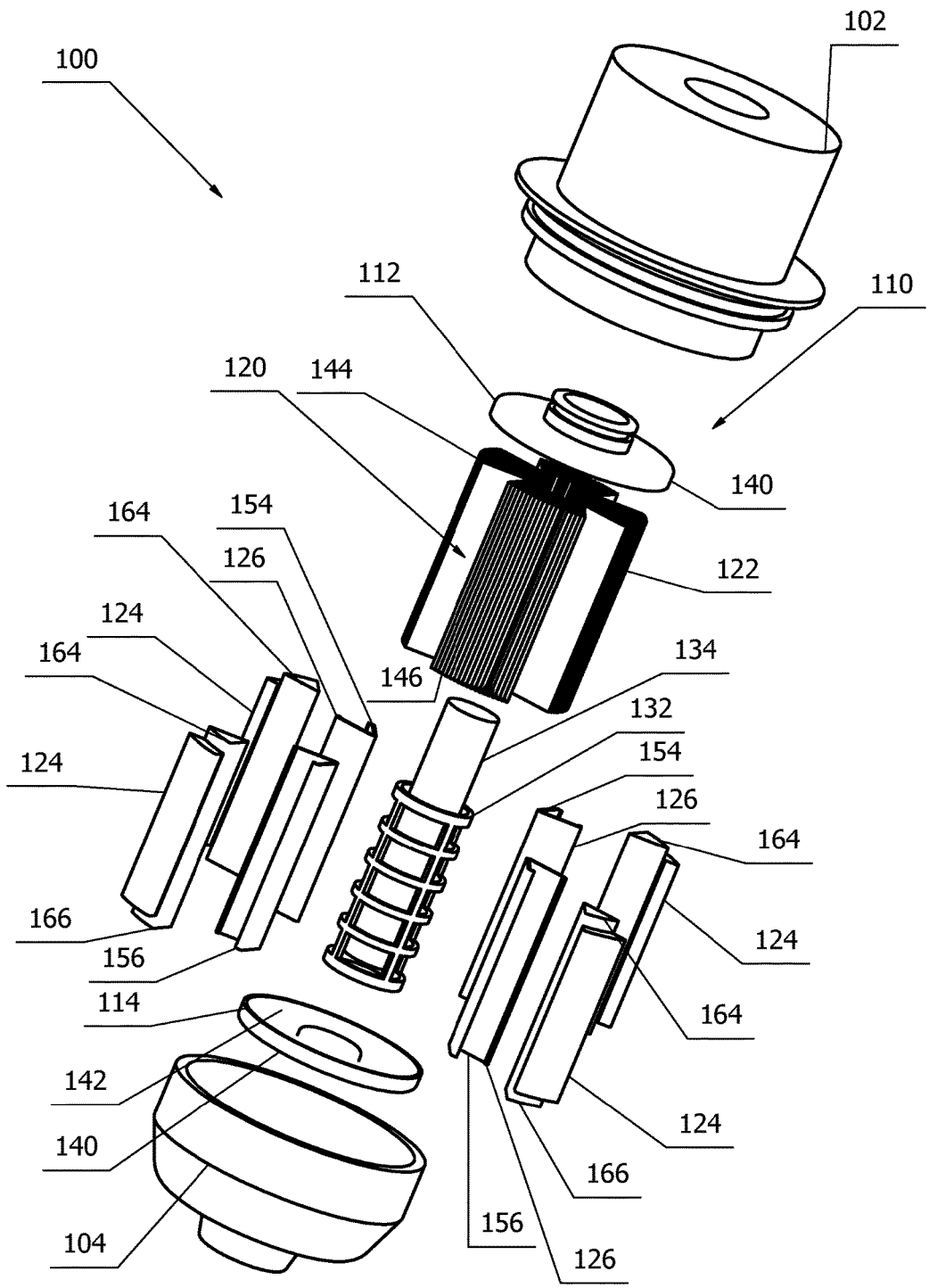
FIGS. 1A & 1B are simplified first and second exploded view illustrations of a liquid filter assembly, taken from different directions, constructed and operative in accordance with a preferred embodiment of the present invention.
Figure 1B:
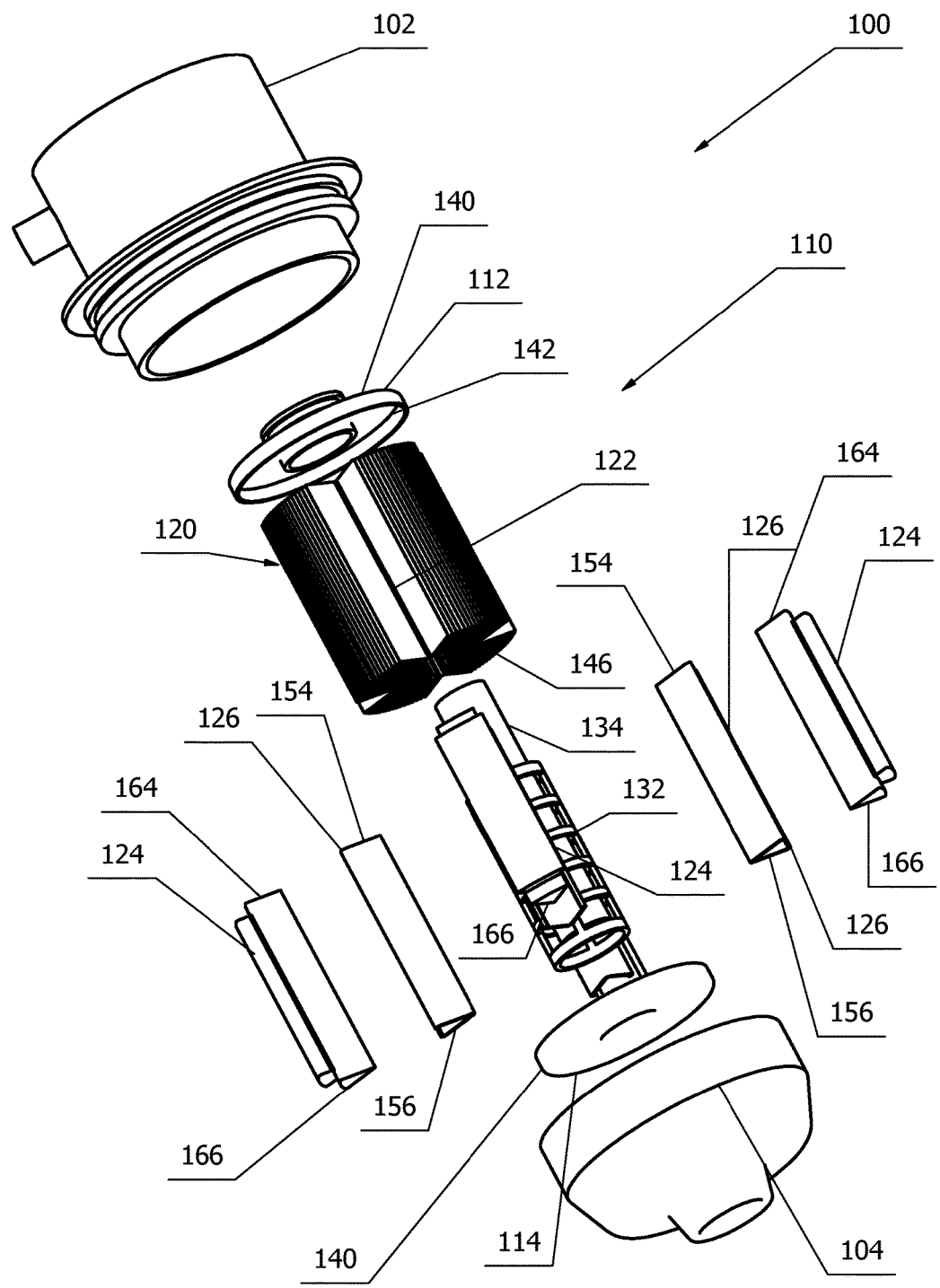
Figure 2:
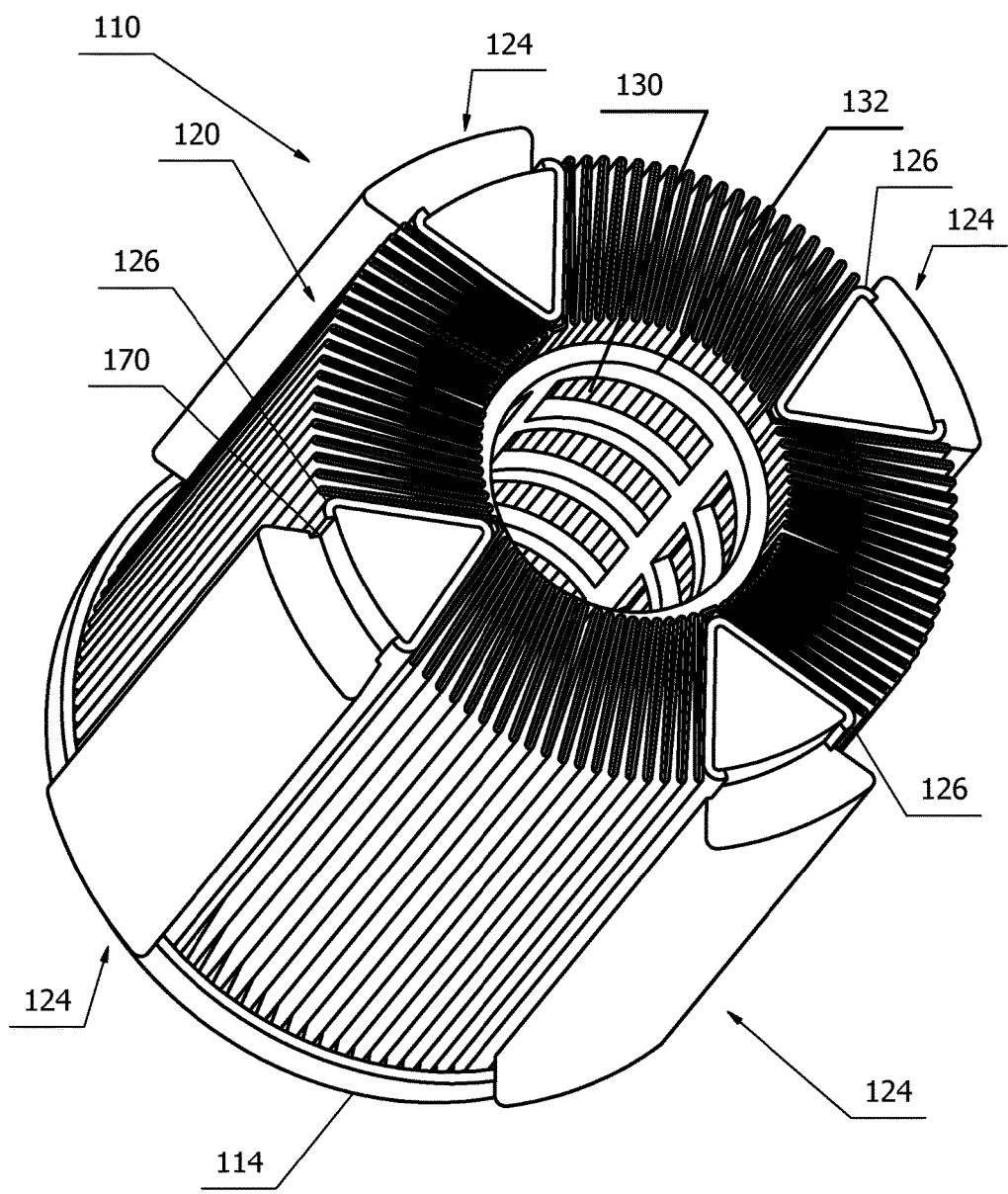
FIG. 2 is a simplified pictorial illustration of a freezing compensating filter element assembly, constructed and operative in accordance with a preferred embodiment of the present invention, forming part of the liquid filter assembly of FIGS. 1A & 1B, wherein a top cap of the liquid filter assembly has been removed.
Figure 3:
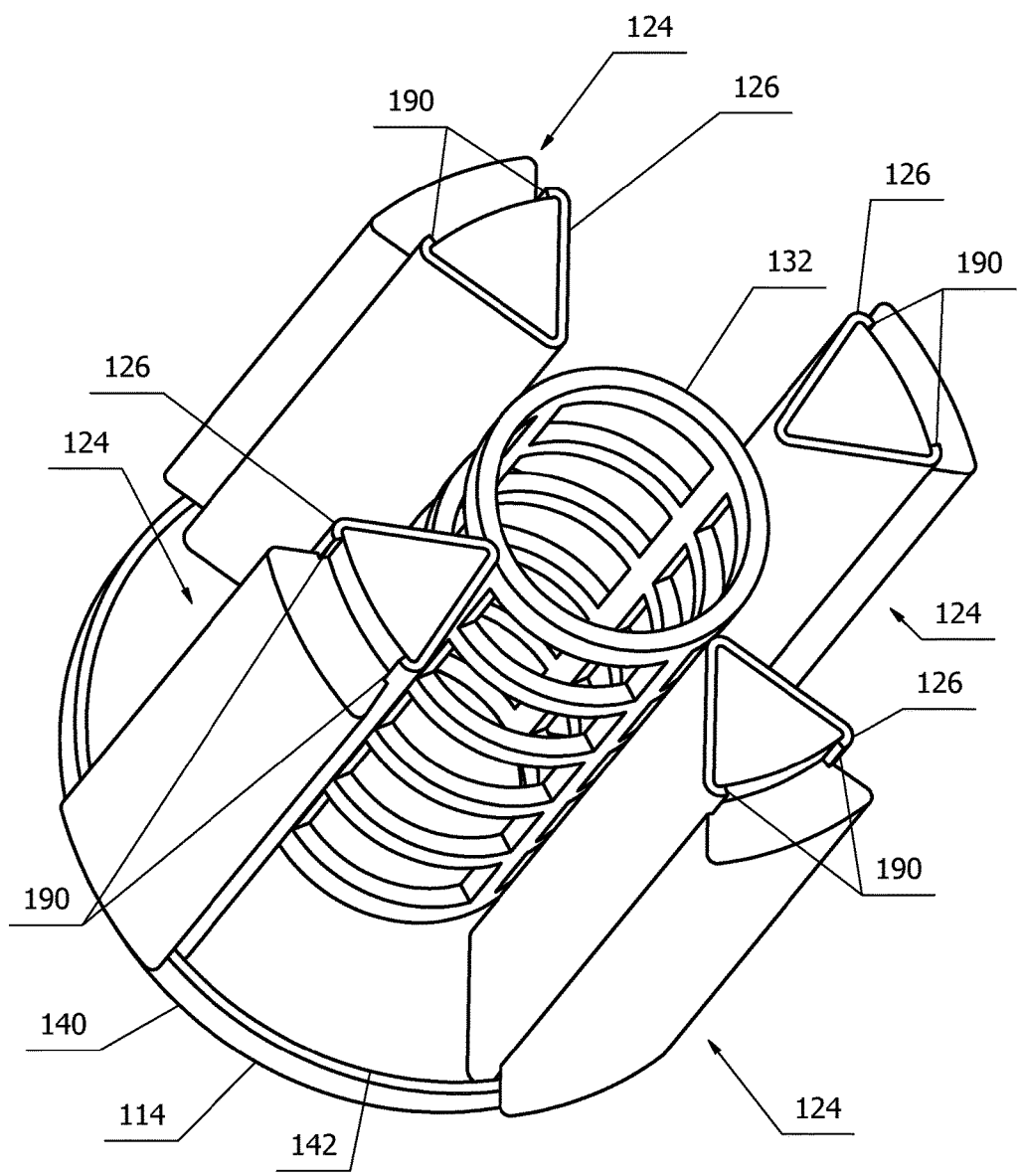
FIG. 3 is a simplified pictorial illustration of portions of the freezing compensating filter element assembly of FIG. 2.
Figure 4:
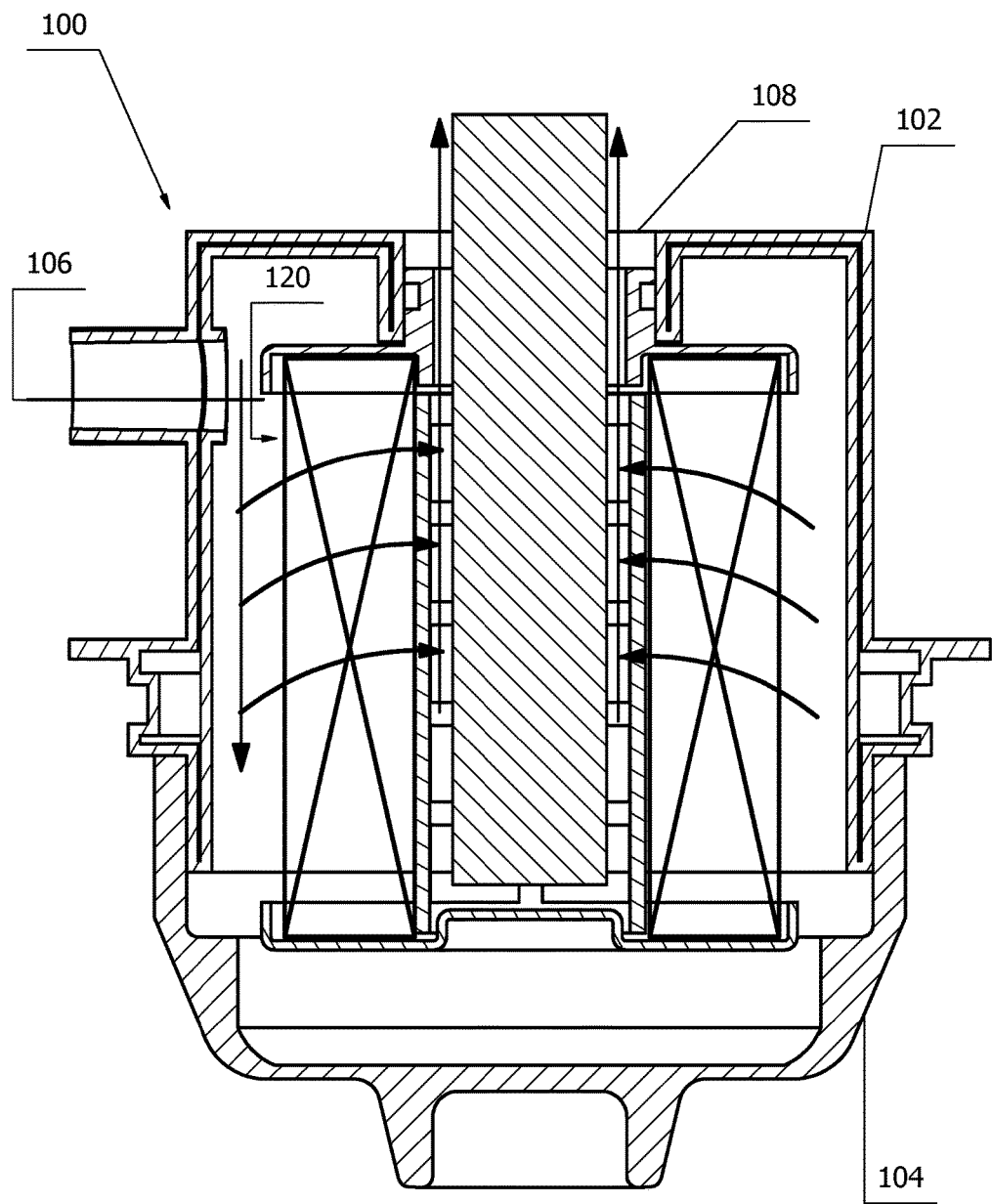
FIG. 4 is a simplified sectional illustration showing liquid flow through the liquid filter assembly of FIGS. 1A-3.
Figure 5:
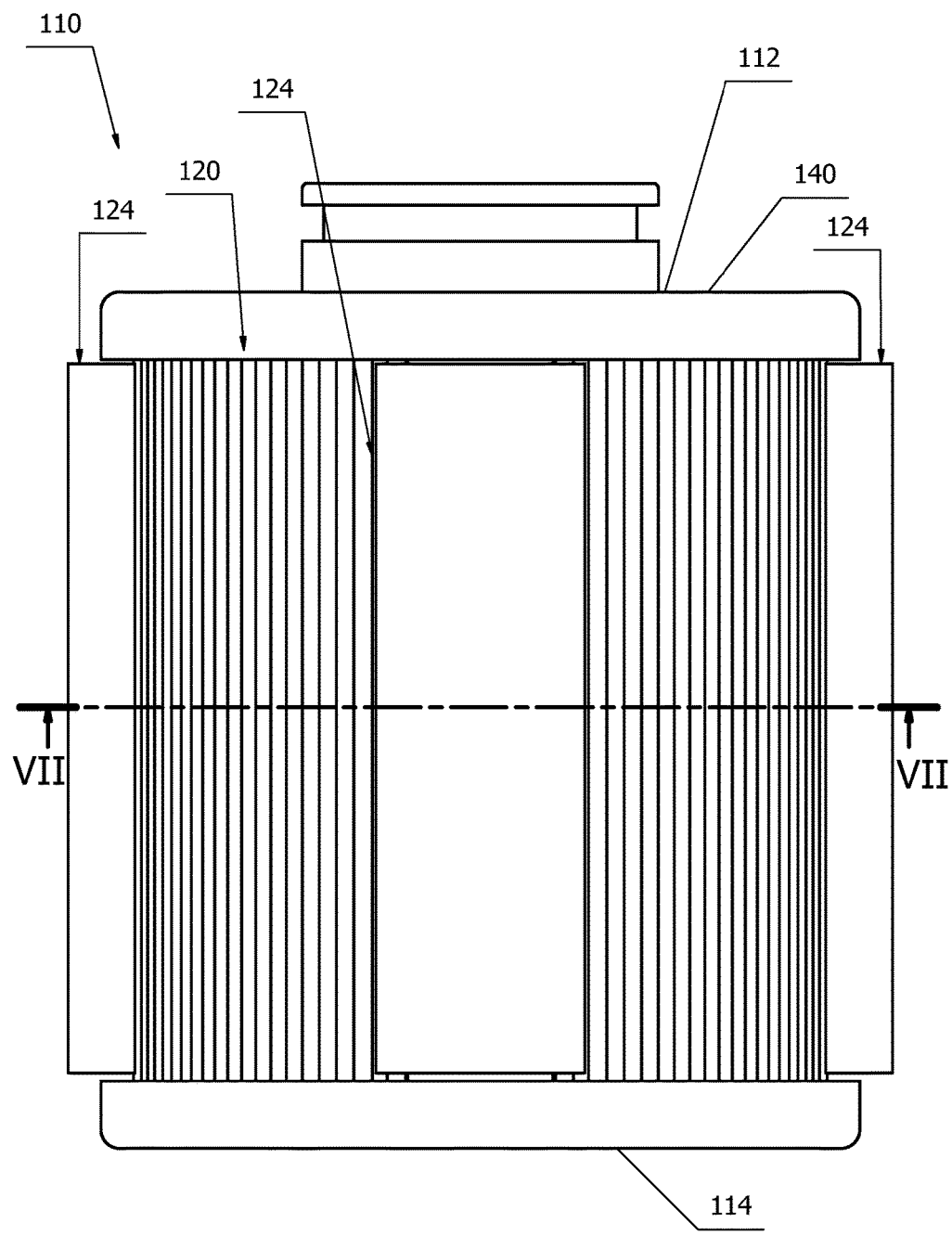
FIG. 5 is a simplified side view illustration of the freezing compensating filter element assembly of FIGS. 1A-4.

As seen particularly in FIGS. 1A & 1B, liquid filter assembly 100 preferably comprises a housing 102 and a cover 104 which is removably secured to the housing 102. Housing 102 is preferably formed with a liquid inlet 106 and a liquid outlet 108, which are seen clearly in FIG. 4.

Disposed within housing 102 is a freezing compensating filter element assembly 110. Freezing compensating filter element assembly 110 preferably includes a top end cap 112 and a bottom end cap 114 onto which are mounted a folded filter medium 120 having multiple expanded interstices 122. Interstices 122 are locations within the folded filter medium 120 where adjacent surfaces of the filter medium are widely mutually spaced. It is a particular feature of the present invention that freezing compressible elements 124 are located in interstices 122. Preferably freezing compressive element retaining channels 126 are disposed in interstices 122 and retain freezing compressible elements 124 therein.

Folded filter medium 120 preferably also defines an inner channel 130 (FIG. 2) in which is preferably located a hollow, apertured reinforcing tube 132 enclosing a heater element 134. An example of a heater element 134 is part No. 1054332 S02 manufactured by Mann-Hummel, Germany.

It is seen that both top and bottom end caps 112 and 114 include an upstanding circumferential wall 140 and an inwardly facing annular surface 142. Preferably top and bottom edges 144 and 146 of folded filter medium 120 are adhesively or otherwise sealed to respective inwardly facing annular surfaces 142 of top and bottom end caps 112 and 114, as are top and bottom edges 154 and 156 of channels 126. Top and bottom surfaces 164 and 166 of freezing compressible elements 124 may also be adhesively or otherwise sealed to inwardly facing annular surfaces 142 of respective top and bottom end caps 112 and 114, or may be located in engagement therewith, and are retained in position by channels 126.

Turning now to FIGS. 6A-6D, it is seen that freezing compressible elements 124 preferably are generally elongate elements having a generally triangular cross-section and are preferably formed of polyurethane or any other suitable sponge-like material. Each freezing compressible element 124 preferably includes an inner elongate triangular portion 170 having a pair of side radially extending surfaces 172, which are joined adjacent ends 173 of portion 170 by a circumferential surface 174.

Each freezing compressible element 124 preferably also includes an outer elongate portion 176 integrally formed thereon, having a generally truncated triangular cross section and having a pair of side radially extending surfaces 178, which are joined by a circumferential surface 180. It is seen that portion 170 typically extends longitudinally beyond outer elongate portion 176 adjacent both ends thereof. It is also seen that an elongate slot 182 is defined between respective radially extending surfaces 172 and 178.

Channels 126 preferably have an overall triangular cross section which conforms to the configuration of interstices 122. Channels 126 are each formed with a pair of mutually facing, spaced elongate edges 190 (as seen in FIGS. 7, 8 and 9), which extend circumferentially and engage elongate slots 182 for retaining freezing compressible elements 124 as part of the freezing compensating filter element assembly 110.

Figure 7:
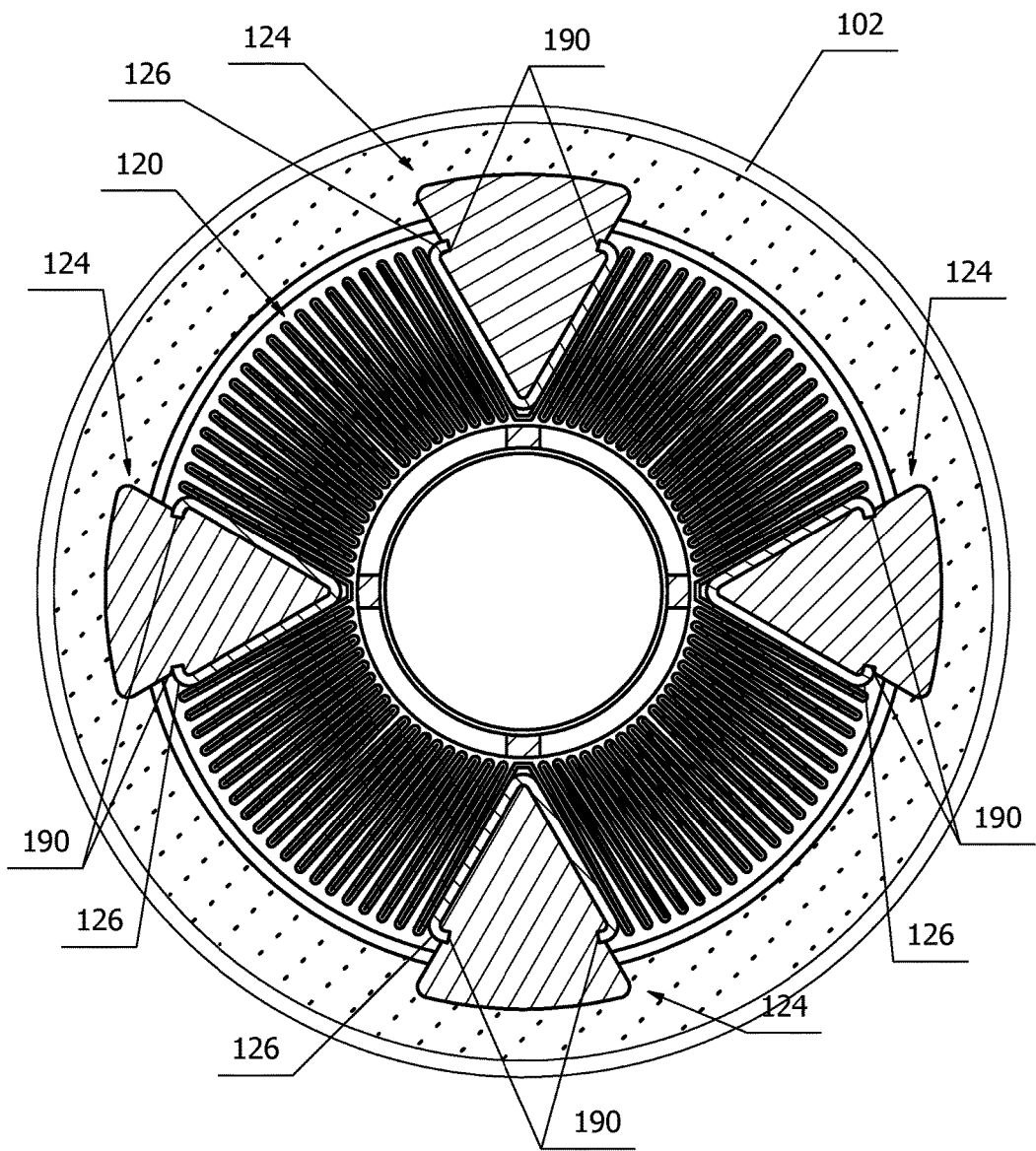
FIG. 7 is a simplified cross-sectional illustration of a portion of the liquid filter assembly of FIG. 4 showing a section of the freezing compensating filter element of FIG. 2, taken along lines VII-VII in FIG. 5, and shows the operative orientation of the compressible elements in an unfrozen state.
Figure 8:
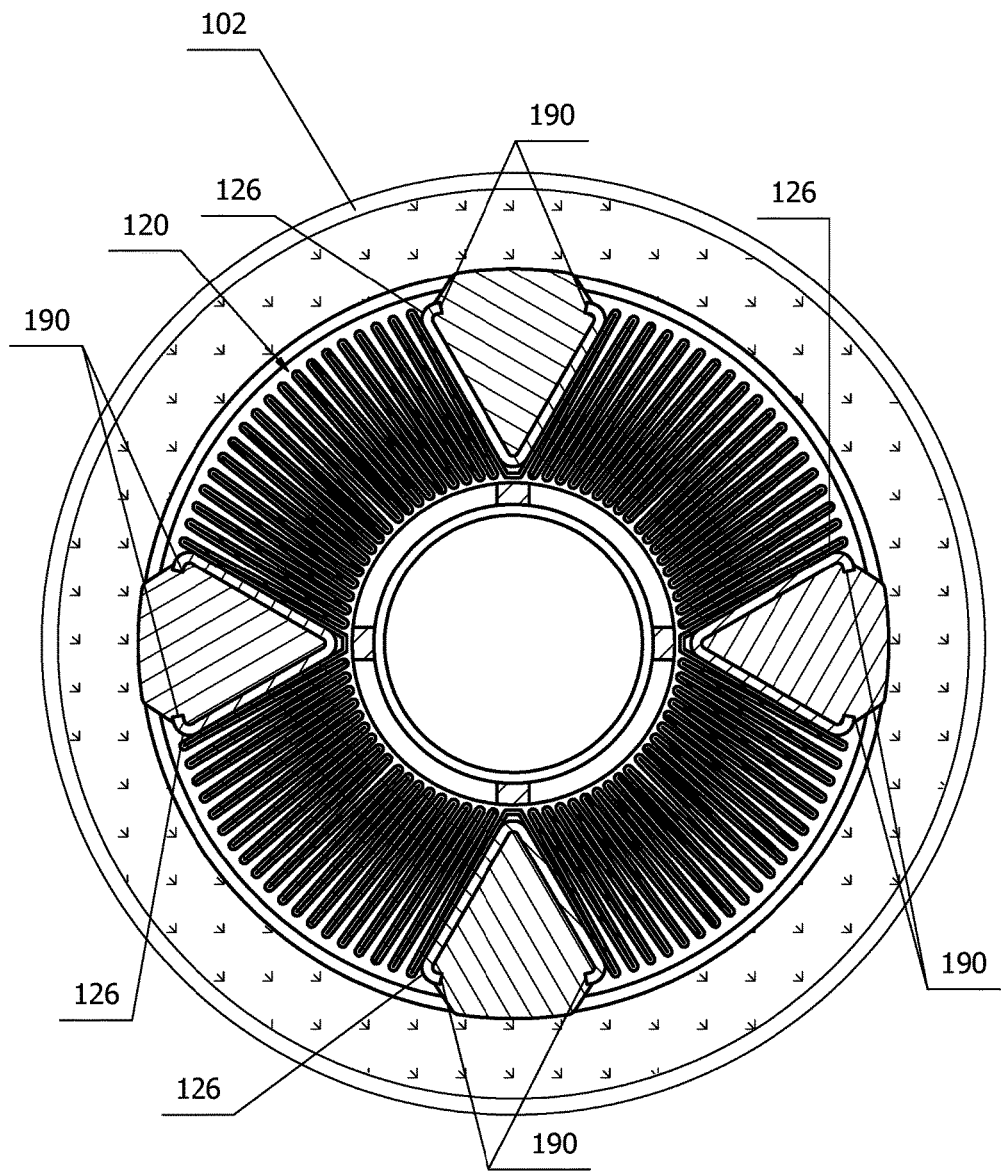
FIG. 8 is a simplified cross-sectional illustration of a portion of the liquid filter assembly of FIG. 4, which is similar to FIG. 7 but shows the operative orientation of the compressible elements in a frozen operational state.
Figure 9:
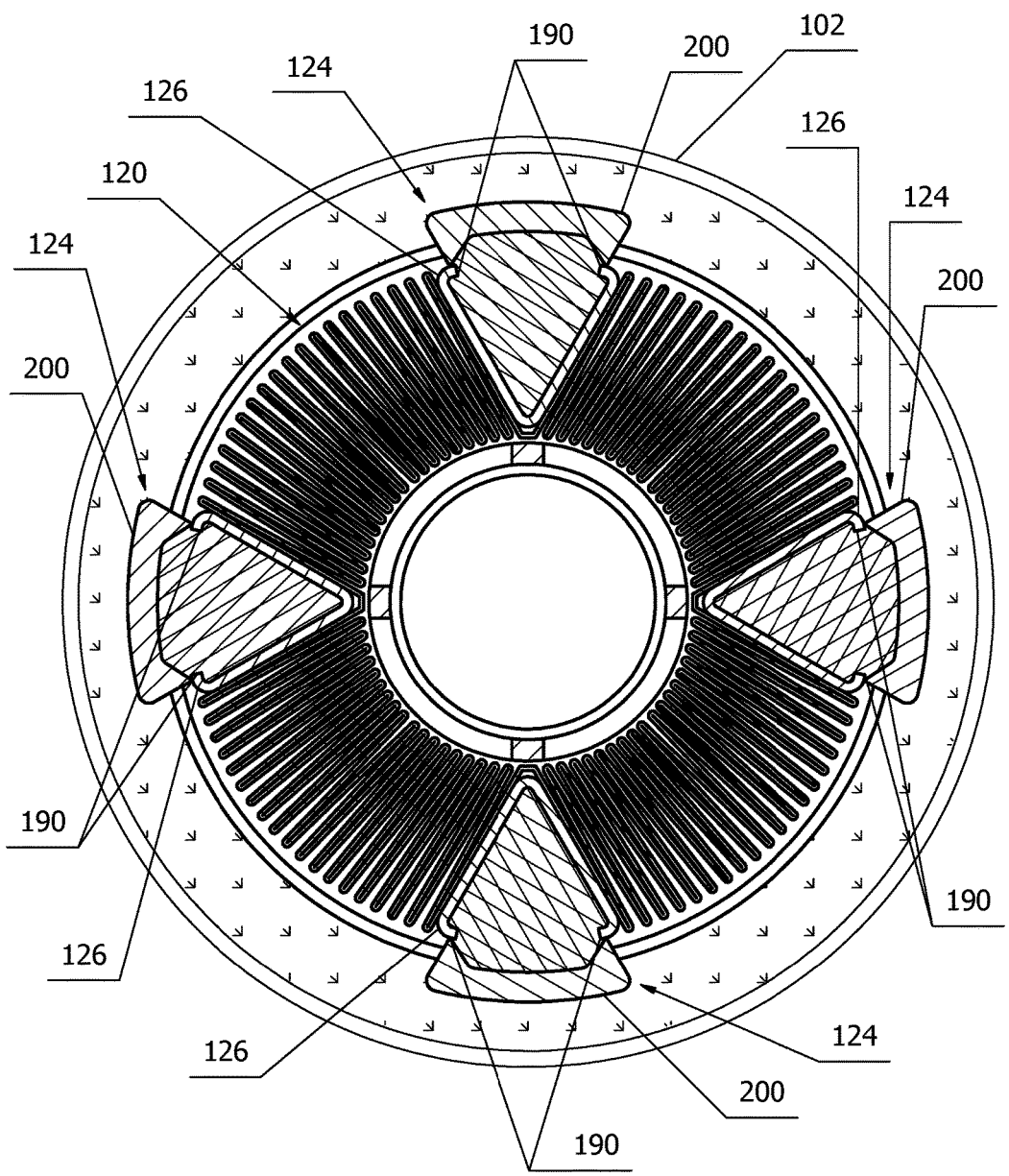
FIG. 9 is a comparative illustration of a portion of the liquid filter assembly of FIG. 4, which is based on the simplified cross-sectional illustrations of FIGS. 7 and 8, and shows the operative orientations of the compressible elements in two operational states, unfrozen and frozen.

Reference is now made to FIGS. 7, 8 and 9, which illustrate the compressibility of the freezing compensating filter element assembly 110 responsive to expansion of liquid to be processed by liquid filter assembly 100, for example, urea solution, typically including water, within the housing 102. Under normal operation with liquid unfrozen and circulating freely within the filter housing 102, freezing compressible elements 124 are as shown in FIG. 7, fully expanded or uncompressed. As shown, freezing compressible elements 124 extend outside the channels 126.

Upon freezing of liquid within the housing 102, the freezing compressible elements 124 of the freezing compensating filter element assembly 110 typically compress in a manner shown in FIG. 8 in contrast to what is shown in FIG. 7. The compressed cross section is particularly shown by cross-hatching and designated by reference numeral 200 in FIG. 9.

It is appreciated that in frozen state, illustrated in FIG. 8 and in comparison to the unfrozen state in FIG. 7, freezing compressible elements 124 extend outside the channels 126 to a lesser extent, if at all, and preferably do not extend outside a cylindrical volume defined by the outer edges of end caps 112 and 114. This compression is caused by the expansion of the liquid present in the filter as the liquid freezes and the compression of the freezing compressible elements 124 allows room for the expansion of the liquid. As a result, little or no outward pressure on housing 102 results when the liquid freezes within the freezing compensating filter element 110 and the integrity of the filter housing 102, cover 104 and other components of the filter are preserved.

It is a particular feature of the present invention that the functionality and integrity of the freezing compensating filter element 110 of which the freezing compressible elements 124 form an integral part, are not compromised by this compression, since generally such compression does not displace or distort the folded filter medium 120 or detach it from the end caps 112 and 114 and because the placement of such freezing compressible elements 124 does not adversely affect liquid flow through the filter.

Reference is now made to FIGS. 10A-18, which illustrate a liquid filter 300, constructed and operative in accordance with another preferred embodiment of the present invention. The filter may be employed for any suitable liquid filtering applications both static and vehicular and may be beneficially employed as a urea filter.

Figure 10A:
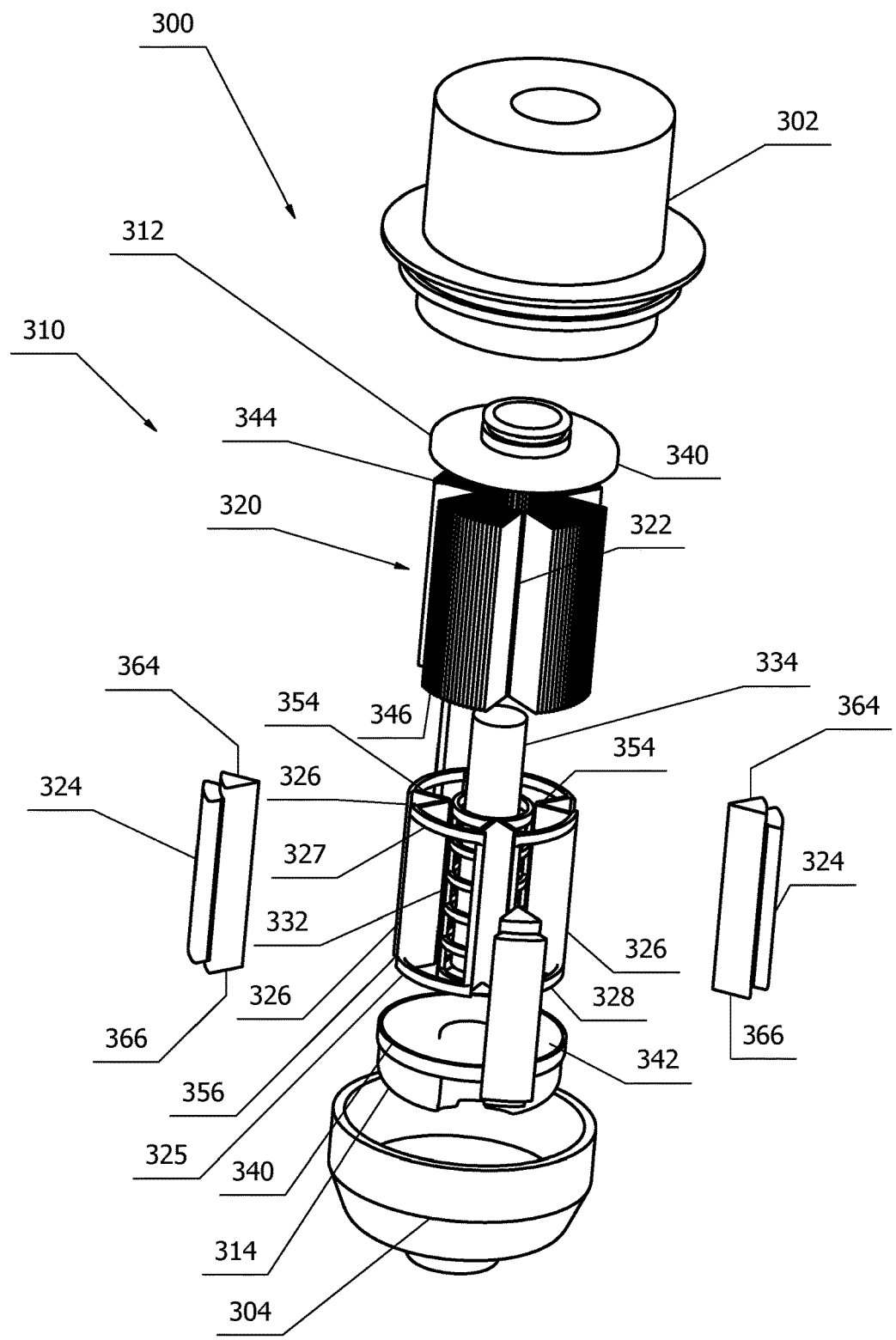
FIGS. 10A & 10B are simplified first and second exploded view illustrations of a liquid filter assembly, taken from different directions, constructed and operative in accordance with another preferred embodiment of the present invention.
Figure 10B:
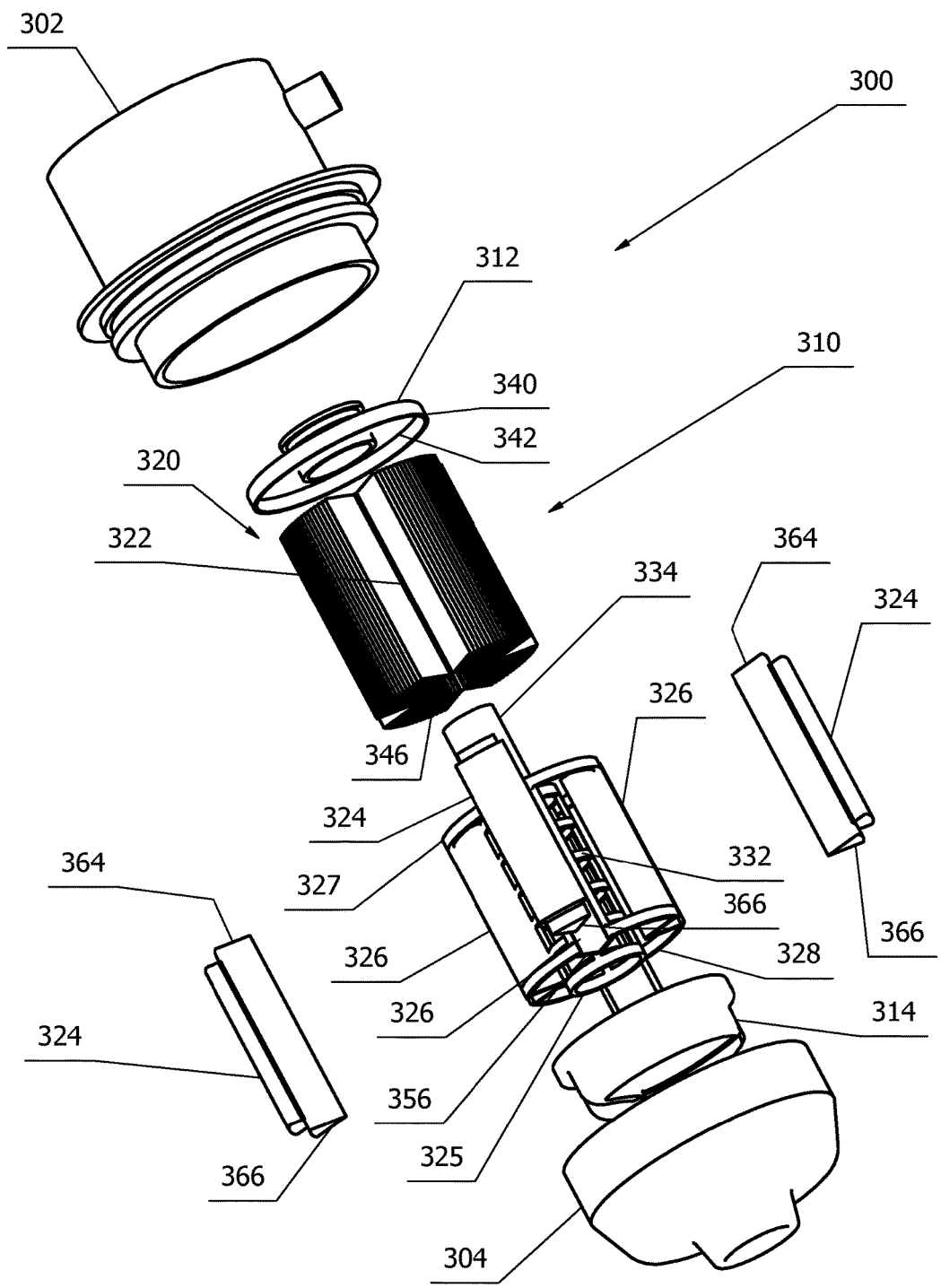
Figure 11:
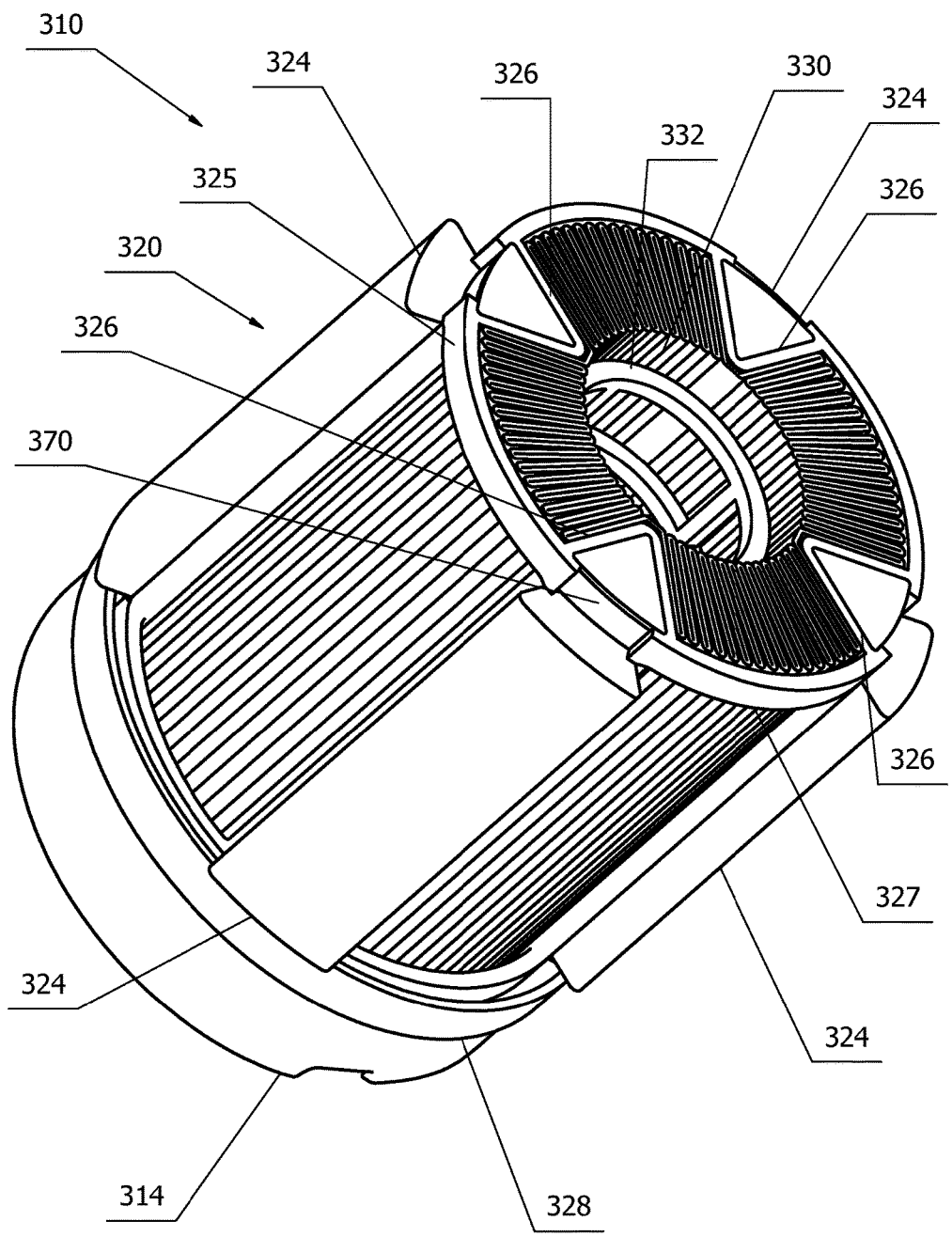
FIG. 11 is a simplified pictorial illustration of a freezing compensating filter element assembly, constructed and operative in accordance with a preferred embodiment of the present invention, forming part of the liquid filter assembly of FIGS. 10A & 10B, wherein a top cap of the liquid filter assembly has been removed.
Figure 12:
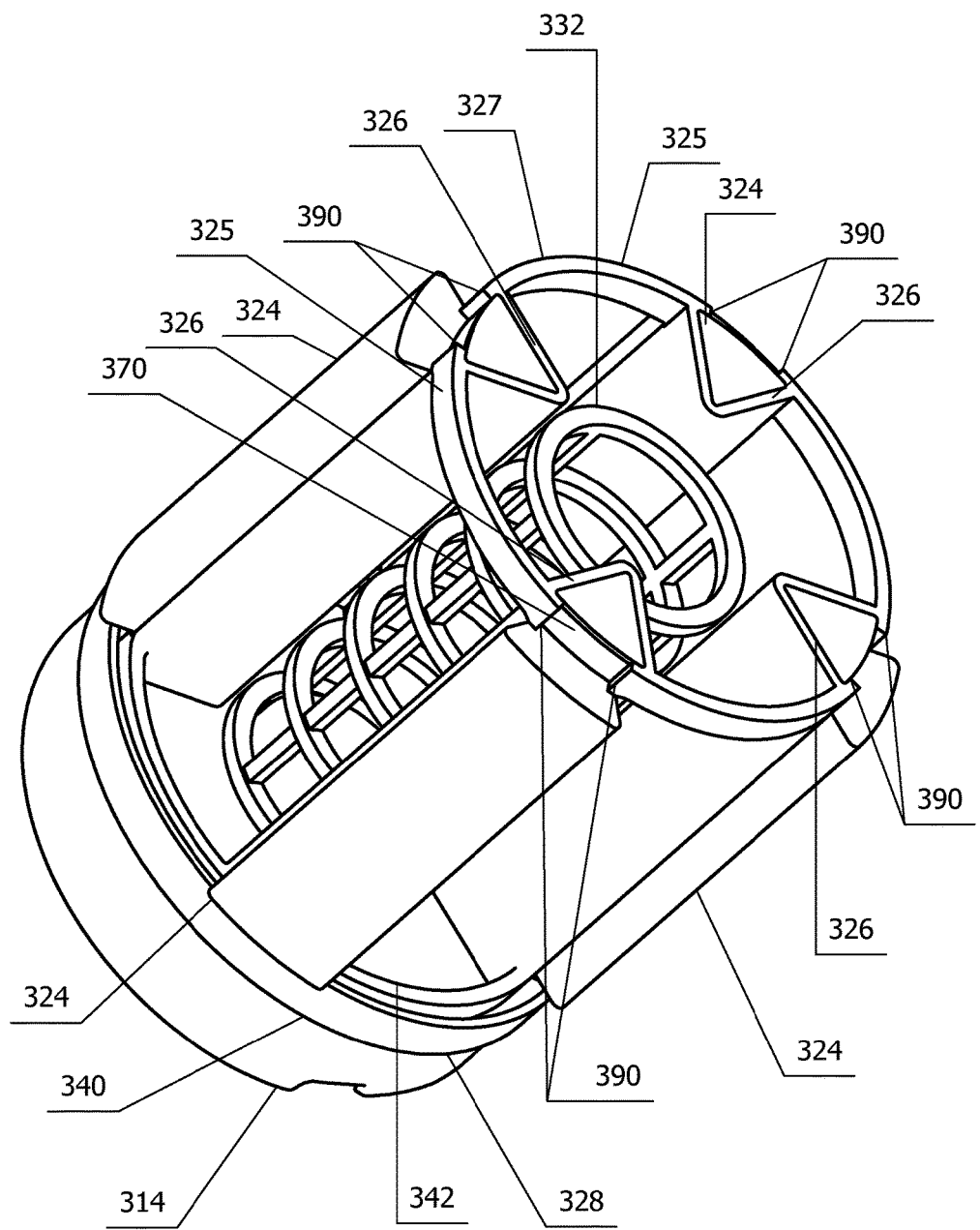
FIG. 12 is a simplified pictorial illustration of portions of the freezing compensating filter element assembly of FIG. 11.

As seen particularly in FIGS. 10A & 10B, liquid filter 300 preferably comprises a housing 302 and a cover 304 which is removably secured to the housing 302. Housing 302 is preferably formed with a liquid inlet 306 and a liquid outlet 308, which are seen clearly in FIG. 13.

Disposed within housing 302 is a freezing compensating filter element 310. Freezing compensating filter element 310 preferably includes a top end cap 312 and a bottom end cap 314 onto which are mounted a folded filter medium 320 having multiple expanded interstices 322. Interstices 322 are locations within the folded filter medium where adjacent surfaces of the filter medium are widely mutually spaced. It is a particular feature of the present invention that freezing compressible elements 324 are located in interstices 322.

Preferably, an integrally formed channel defining element 325 is provided and includes compressive element retaining channels 326, which are disposed in interstices 322 and retain freezing compressible elements 324 therein. Channel defining element 325 preferably defines respective top and bottom support rings 327 and 328, which support channels 326 and which, in turn, are seated in top and bottom end caps 312 and 314.

Folded filter medium 320 preferably also defines an inner channel 330 in which is preferably located a hollow, apertured reinforcing tube 332 enclosing a heater element 334. An example of a heater element 134 is part No. 1054332 S02 manufactured by Mann-Hummel, Germany.

It is seen that both top and bottom end caps 312 and 314 include an upstanding circumferential wall 340 and an inwardly facing annular surface 342. Preferably top and bottom edges 344 and 346 of folded filter medium 320 are adhesively or otherwise sealed to respective inwardly facing annular surfaces 342 of top and bottom end caps 312 and 314, as are top and bottom edges 354 and 356 of channels 326. Top and bottom surfaces 364 and 366 of freezing compressible elements 324 may also be adhesively or otherwise sealed to inwardly facing annular surfaces 342 of respective top and bottom end caps 312 and 314, or may be located in engagement therewith, and are retained in position by channels 326.

Turning now to FIGS. 15A-15D, it is seen that freezing compressible elements 324 preferably are generally elongate elements having a generally triangular cross-section and are preferably formed of polyurethane or any other suitable sponge-like material. Each freezing compressible element 324 preferably includes an inner elongate triangular portion 370 having a pair of side radially extending surfaces 372, which are joined adjacent ends 373 of portion 370 by a circumferential surface 374. Each freezing compressible element 324 preferably also includes an outer elongate portion 376 integrally formed thereon having a generally truncated triangular cross section having a pair of side radially extending surfaces 378, which are joined by a circumferential surface 380. It seen that portion 370 typically extends longitudinally beyond outer elongate portion 376 adjacent both ends thereof. It is also seen that an elongate slot 382 is defined between respective radially extending surfaces 372 and 378.

Channels 326 preferably have an overall triangular cross section which confirms to the configuration of interstices 322. Channels 326 are each formed with a pair of mutually facing, spaced elongate edges 390 (as seen in FIGS. 16, 17 and 18) which extend circumferentially and engage elongate slots 382 for retaining freezing compressible elements 324 as part of the freezing compensating filter element 310.

Reference is now made to FIGS. 16, 17 and 18, which illustrate the compressibility of the freezing compensating filter element 310 responsive to expansion of liquid to be processed by liquid filter 300, for example, urea solution, typically including water, within the housing 302. Under normal operation with liquid unfrozen and circulating freely within the filter, freezing compressible elements 324 are as shown in FIG. 16, fully expanded or uncompressed. As shown, freezing compressible elements 324 extend outside the channels 326.

Upon freezing of liquid within the housing 302, the freezing compressible elements 324 of the freezing compensating filter element 310 typically compress in a manner shown in FIG. 17. In the comparative illustration of FIG. 18, the compressed cross section is particularly shown by cross-hatching and designated by reference numeral 400, and is shown in contrast to the corresponding cross sections of freezing compressible elements 324 in the unfrozen state, as in FIG. 16, and in the frozen state, as seen in FIG. 17. In the frozen state, seen in FIG. 17, freezing compressible elements extend outside the channels 326 to a lesser extent, if at all, and preferably do not extend outside a cylindrical volume defined by the outer edges of end caps 312 and 314. This compression is caused by the expansion of the liquid present inside the filter housing 302 as the liquid freezes and the compression of the freezing compressible elements 324 allows room for the expansion of the liquid inside the filter housing. As a result, little or no outward pressure results when the liquid freezes within the freezing compensating filter element 310 and the integrity of the filter housing 302, cover 304 and other components of the filter are preserved.

It is a particular feature of the present invention that the functionality and integrity of the freezing compensating filter element 310, of which the freezing compressible elements 324 form an integral part, are not compromised by this compression, since generally such compression does not displace or distort the folded filter medium 320 or detach it from the end caps 312 and 314 and because the placement of such freezing compressible element does not adversely affect liquid flow through the filter. FIG. 18 illustrates the freezing compensating filter element 310 in a compressed state, such as when the entire filter is in a frozen state.

Reference is now made to FIGS. 19A-27, which illustrate a liquid filter 500, constructed and operative in accordance with another preferred embodiment of the present invention. The filter may be employed for any suitable liquid filtering applications both static and vehicular and may be beneficially employed as a urea filter.

As seen particularly in FIGS. 19A & 19B, liquid filter 500 preferably comprises a housing 502 and a cover 504 which is removably secured to the housing 502. Housing 502 is preferably formed with a liquid inlet 506 and a liquid outlet 508, which are seen clearly in FIG. 22.

Disposed within housing 502 is a freezing compensating filter element 510. Freezing compensating filter element 510 preferably includes a top end cap 512 and a bottom end cap 514 onto which are mounted a folded filter medium 520 having multiple expanded interstices 522. Interstices 522 are locations within the folded filter medium where adjacent surfaces of the filter medium are widely mutually spaced. It is a particular feature of the present invention that freezing compressible elements 524 are located in interstices 522. Preferably an integrally formed channel defining element 525 is provided and includes compressive element retaining channels 526, which are disposed in interstices 522 and retain freezing compressible elements 524 therein. Channel defining element 525 preferably defines respective top and bottom support rings 527 and 528, which support channels 526 and which, in turn, are seated in top and bottom end caps 512 and 514.

Folded filter medium 520 preferably also defines an inner channel 530 in which is preferably located a hollow, apertured reinforcing tube 532.

It is seen that both top and bottom end caps 512 and 514 include an upstanding circumferential wall 540 and an inwardly facing annular surface 542. Preferably top and bottom edges 544 and 546 of folded filter medium 520 are adhesively or otherwise sealed to respective inwardly facing annular surfaces 542 of top and bottom end caps 512 and 514, as are top and bottom edges 554 and 556 of channels 526. Top and bottom surfaces 564 and 566 of freezing compressible elements 524 may also be adhesively or otherwise sealed to inwardly facing annular surfaces 542 of respective top and bottom end caps 512 and 514, or may be located in engagement therewith, and are retained in position by channels 526.

Turning now to FIGS. 24A-24D, it is seen that freezing compressible elements 524 preferably are generally elongate elements having a generally triangular cross-section and are preferably formed of polyurethane or any other suitable sponge-like material. Each freezing compressible element 524 preferably includes an inner elongate triangular portion 570 having a pair of side radially extending surfaces 572, which are joined adjacent ends 573 of portion 570 by a circumferential surface 574. Each freezing compressible element 524 preferably also includes an outer elongate portion 576 integrally formed thereon having a generally truncated triangular cross section having a pair of side radially extending surfaces 578, which are joined by a circumferential surface 580. It seen that portion 570 typically extends longitudinally beyond outer elongate portion 576 adjacent both ends thereof. It is also seen that an elongate slot 582 is defined between respective radially extending surfaces 572 and 578.

Channels 526 preferably have an overall triangular cross section which confirms to the configuration of interstices 522. Channels 526 are formed with a pair of mutually facing, spaced elongate edges 590 (as seen in FIGS. 25, 26 and 27) which extend circumferentially and engage elongate slots 582 for retaining freezing compressible elements 524 as part of the freezing compensating filter element 510.

Reference is now made to FIGS. 25, 26 and 27, which illustrate the compressibility of the freezing compensating filter element 510 responsive to expansion of liquid to be processed by liquid filter 500, for example, urea solution, typically including water, within the housing 502. Under normal operation with liquid unfrozen and circulating freely within the filter housing 502, freezing compressible elements 524 are as shown in FIG. 25, fully expanded or uncompressed. As shown, freezing compressible elements 524 extend outside the channels 526.

Upon freezing of liquid within the housing 502, the freezing compressible elements 524 of the freezing compensating filter element 510 typically compress in a manner shown in FIG. 26. The comparative illustration of FIG. 27 shows the compressed cross section 600 by cross-hatching and illustrates the contrast between the state of the freezing compressible elements 524 in the unfrozen state, as in FIG. 25, and their state in the frozen state, seen in FIG. 26. In the frozen state, freezing compressible elements 524 extend outside the channels 526 to a lesser extent, if at all, and preferably do not extend outside a cylindrical volume defined by the outer edges of end caps 512 and 514. This compression is caused by the expansion of the liquid present within the housing 502 as the liquid freezes and the compression of the freezing compressible elements 524 allows room for the expansion of the liquid. As a result, little or no outward pressure results when the liquid freezes within the freezing compensating filter element 510 and the integrity of the filter housing 502, cover 504 and other components of the filter are preserved.

It is a particular feature of the present invention that the functionality and integrity of the freezing compensating filter element 510, of which the freezing compressible elements 524 form an integral part, are not compromised by this compression, since generally such compression does not displace or distort the folded filter medium 520 or detach it from the end caps 512 and 514 and because the placement of such freezing compressible element does not adversely affect liquid flow through the filter. FIG. 26 illustrates the freezing compensating filter element 510 in a compressed state, such as when the entire filter is in a frozen state.

It will be appreciated by persons skilled in the art that the present invention is not limited by what has been particularly shown and described hereinabove. Rather the scope of the present invention includes both combinations and subcombinations of the various features described hereinabove as well as variations thereof which would occur to persons skilled in the art, which are not in the prior art.

The invention claimed is:
1. A freezing resistant liquid filter comprising:
a housing having a liquid inlet and a liquid outlet; and
a freezing compensating filter element disposed within said housing and including a folded filter medium having at least one compressible element located exteriorly and radially outwardly of said folded filter medium, said at least one compressible element being located at least partially within at least one fold in said folded filter medium.

2. A freezing resistant liquid filter according to claim 1 and wherein said freezing compensating filter element also comprises at least one retaining element retaining said at least one compressible element.

3. A freezing resistant liquid filter according to claim 1 and wherein said at least one compressible element is formed to have a cross-section which generally corresponds to a cross-section of said at least one fold in said folded filter medium in which it is located.

4. A freezing resistant liquid filter according to claim 2 and wherein said at least one compressible element is formed to have a cross-section which generally corresponds to a cross-section of said at least one fold in said folded filter medium in which it is located.

5. A freezing resistant liquid filter according to claim 2 and wherein said at least one retaining element defines configurations of said at least one compressible element in both compressed and non-compressed operative orientations.

6. A freezing resistant liquid filter according to claim 4 and wherein said at least one retaining element defines configurations of said at least one compressible element in both compressed and non-compressed operative orientations.

7. A freezing compensating filter element for use in a freezing resistant liquid filter, said freezing compensating filter element including a folded filter medium having a plurality of folds and at least one compressible element located at least partially exteriorly and radially outwardly of said folds, said at least one compressible element being located at least partially within one of said plurality of folds.

8. A freezing compensating filter element according to claim 7 and wherein said freezing compensating filter element also comprises at least one retaining element retaining said at least one compressible element.

9. A freezing compensating filter element according to claim 7 and wherein said at least one compressible element is formed to have a cross-section which generally corresponds to a cross-section of said one of said plurality of folds in which it is at least partially located.

10. A freezing compensating filter element according to claim 8 and wherein said at least one compressible element is formed to have a cross-section which generally corresponds to a cross-section of said one of said plurality of folds in which it is at least partially located.

\* \* \* \* \*